(12) United States Patent
Obara et al.

(10) Patent No.: US 7,131,577 B2
(45) Date of Patent: Nov. 7, 2006

(54) AUTOMATIC TRANSACTION APPARATUS, CONTROL METHOD OF AUTOMATIC TRANSACTION APPARATUS, AND AUTOMATIC TRANSACTION SYSTEM

(75) Inventors: Tomomichi Obara, Maebashi (JP); Satoshi Tomi, Inagi (JP)

(73) Assignees: Fujitsu Limited, Kawasaki (JP); Fujitsu Frontech Limited, Inagi (JP)

( * ) Notice: Subject to any disclaimer, the term of this patent is extended or adjusted under 35 U.S.C. 154(b) by 150 days.

(21) Appl. No.: 10/828,464

(22) Filed: Apr. 21, 2004

(65) Prior Publication Data

US 2005/0109831 A1 May 26, 2005

(30) Foreign Application Priority Data

Nov. 20, 2003 (JP) ............................... 2003-390477

(51) Int. Cl.
*G06F 17/60* (2006.01)
(52) U.S. Cl. ...................................... 235/379
(58) Field of Classification Search ................. 235/379
See application file for complete search history.

(56) References Cited

U.S. PATENT DOCUMENTS 6,209,029 B1 * 3/2001 Epstein et al. ............... 709/219
2004/0148375 A1 * 7/2004 Levett et al. ................ 709/223

FOREIGN PATENT DOCUMENTS

| JP | 2001-076212 | 3/2000 |
| JP | 2000-298752 | 10/2000 |
| JP | 2002-024912 | 1/2002 |

* cited by examiner

*Primary Examiner*—Daniel Stcyr
(74) *Attorney, Agent, or Firm*—Staas & Halsey LLP

(57) ABSTRACT

An automatic transaction apparatus communicates with a Web server and performs automatic transaction according to the operation of a user in order to perform automatic transaction processing with decreasing the number of times of requests to the Web server. Objects for each processing of the transaction processing are embedded in a screen content of a Web server, a part of the screen can be updated by an applet and script of the screen content, without downloading all the updates of the screen from the Web server. The screen can be updated without communication with the Web server. The transaction performance (speed) of the automatic transaction apparatus can be improved, and load of the Web server can be decreased.

22 Claims, 26 Drawing Sheets

FIG. 6

| COMMAND TYPE | COMMAND |
|---|---|
| CRW COMMAND | CARD INSERTION |
| | CARD EJECT |
| RPR COMMAND | PRINT |
| | RELEASE |
| PPR COMMAND | PASSBOOK INSERTION |
| | PRINT |
| | MS WRITE |
| | PASSBOOK EJECT |
| | AUTO TURN PAGE |
| BRU COMMAND (CRU COMMAND) | INITIALIZATION |
| | ACCEPTANCE/COUNTING |
| | STORE |
| | DEPOSIT RETURN |
| | FEED |
| | RELEASE |
| | CAPTURE |
| | TRANSPORT PATH CHECK |
| | JAM RESET |

FIG. 7

| AGENT | METHOD | IO CONTROLLER | | | | | | | | |
|---|---|---|---|---|---|---|---|---|---|---|
| | | NONE | BILL | COIN | PASSBOOK | CARD | RECEIPT | JOURNAL | TRANS-ACTION | TEN KEY |
| SYNCHRONIZATION | INITIALIZE | | ● | ● | ● | ● | ● | ● | ● | ● |
| SYNCHRONIZATION | MECHANISM RESET | | ● | ● | ● | ● | ● | ● | | |
| SYNCHRONIZATION | BILL/COIN INSERT | | ● | ● | | | | | | |
| SYNCHRONIZATION | MEDIUM SIMULTANEOUS EJECT | | ● | ● | ● | ● | ● | | | |
| SYNCHRONIZATION | PRINT/FEED/MS WRITE/EJECT PREPARE | | ● | ● | ● | ● | ● | ● | | |
| SYNCHRONIZATION | DEPOSIT RETURN | | ● | ● | | | | | | |
| SYNCHRONIZATION | STORAGE | | ● | ● | | | | | | |
| SYNCHRONIZATION | FORCE-EJECT/CAPTURE | | | | ● | ● | ● | | | |
| SYNCHRONIZATION | OBTAIN UNIT INFORMATION/SET TRANSACTION STATUS/TWO-SCREEN DISPLAY | | ● | ● | ● | ● | ● | ● | ● | ● |
| SYNCHRONIZATION | CANCEL | | | | | | | | | |
| SYNCHRONIZATION | | | | | | | | | | |
| SYNCHRONIZATION | DEPOSIT/WITHDRAWAL PREPARE | | ● | ● | | | | | | |
| SYNCHRONIZATION | FORCE REPLENISH | | ● | ● | | | | | | |
| SYNCHRONIZATION | JAM RESET | | | | ● | ● | | | | |
| SYNCHRONIZATION | CARD/PASSBOOK INSERT | | | | | | | | | |
| POST | POST PROCESS | ● | | | | | | | | |
| POST | POST DATA HOLD | ● | | | | | | | | |
| TEXT DISPLAY | FONT SET | ● | | | | | | | | |
| TEXT DISPLAY | TEXT DISPLAY | ● | | | | | | | | |
| TEXT DISPLAY | TEXT ERASE | ● | | | | | | | | |

FIG. 8

| AGENT | METHOD | IO CONTROLLER | | | | | | | | |
|---|---|---|---|---|---|---|---|---|---|---|
| | | NONE | BILL | COIN | PAS BOOK | CARD | RECEIPT | JOURNAL | TRANS-ACTION | TEN KEY |
| BILL CONTROL | RECEIPT/COUNTING STORAGE DEPOSIT RETURN RELEASE CANCEL | | ●●●●● | | | | | | | |
| PASSBOOK CONTROL | PRINT LINE SET/PAGE MARK READ MS READ AUTO TURN PAGE PAGE CHECK AUTO TURN SET PASSBOOK TYPE INFORMATION | | | | ●●●●● | | | | | |
| CARD CONTROL | CARD INSERT CANCEL MONEY TRANSFER CARD PRINT MONEY TRANSFER CARD ISSUE EJECT PREPARE | | | | | ●●●●● | | | | |
| RECEIPT CONTROL | REGISTER OVERLAY EJECT PREPARE | | | | | | ●● | | | |
| TRANSACTION CONTROL | SET TRANSACTION INFORMATION MONITOR DEVICE STATUS OBTAIN DEVICE STATUS SET OSPERATION INFORMATION CANCEL | | | | | | | | ●●●●● | |
| TEN KEY | TEN KEY INPUT START TEN KEY INPUT END | | | | | | | | | ●● |

FIG. 9

```
<HTML>
<HEAD>
<TITLE>WebATM Sample</TITLE>
</HEAD>
<BODY>
// SPECIFY AGENT WHICH IS CALLED UP IN THE SCREEN
<APPLET CODE="U_agtSync_initial.class" codebase = "http://webatm:8080/webatm"
        WIDTH="0" HEIGHT="0" NAME="U_agtSync_initial" >
</APPLET>
// MAKE MAYSCRIPT DEFINITION SUCH THAT POSTAgent CALLS UP FUNCTION OF Java Script
<APPLET CODE="U_agtPost.class"  codebase = "http://webatm:8080/webatm"
WIDTH="0" HEIGHT="0" NAME="U_agtPost" MAYSCRIPT>

<SCRIPT language="javascript">
<!--
        // DEFINE FUNCTION THAT IS CALLED UP FROM POSTAgent (REQUISITE)
        function postFunc(postData){ document.sys_form.ioResponse.value = postData;
                    window.document.sys_form.submit();
        }
        // CALL UP INITIAL METHOD IN SYNCHRONIZATION Agent
        ret = document.U_agtSync_initial.initial (inputParam, parseInt(postMode), parseInt(maxTimer));
        if (ret < 0) {
                // ABNORMAL NOTIFY PROCESS
                ~OMIT~
        }
//-->
</SCRIPT>
</BODY>
</HTML>
```

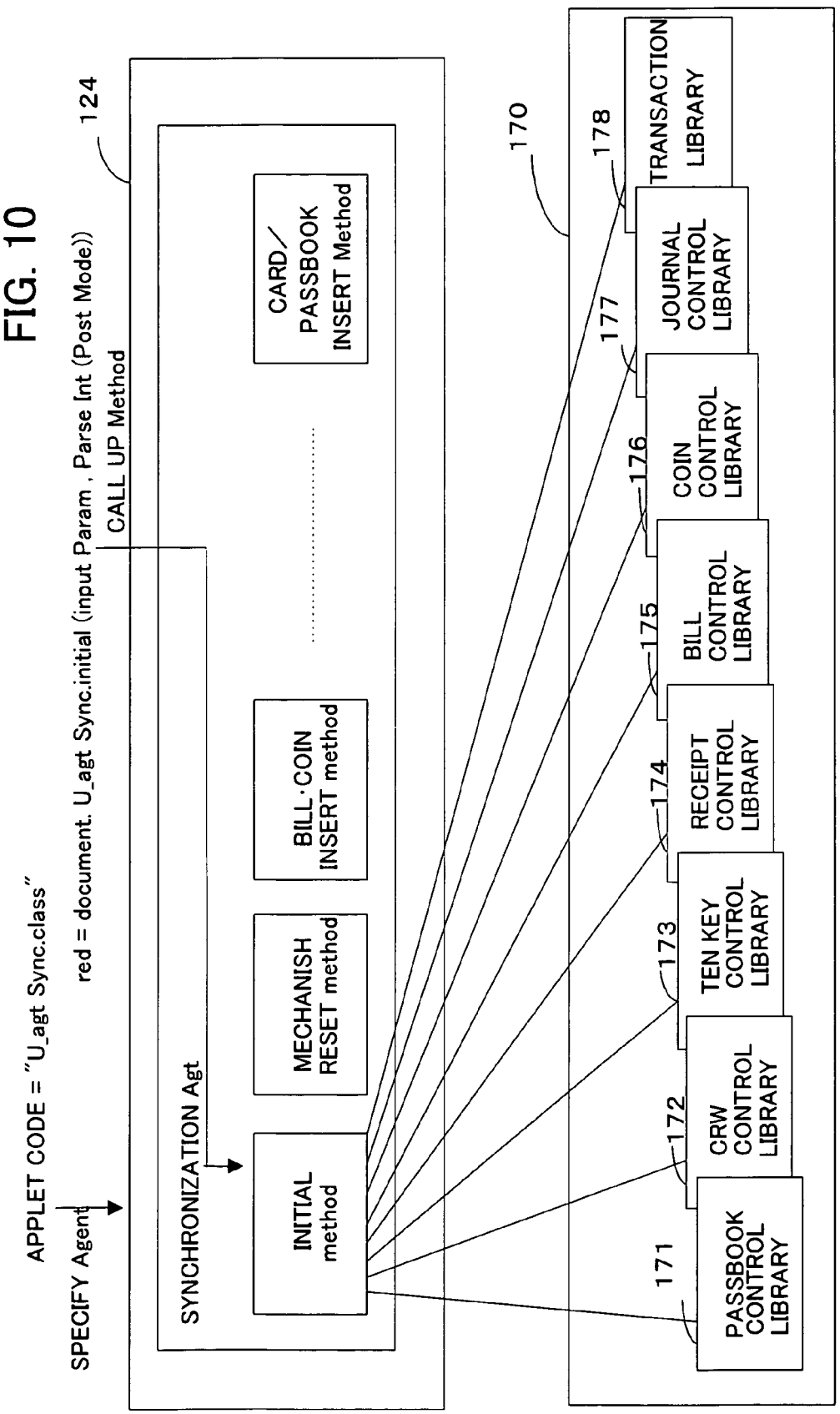

| 1 | 1 | 1 | 1 | 1 | 1 | 1 | 1 |
|---|---|---|---|---|---|---|---|
| BILL | COIN | PASSBOOK | CARD | RECEIPT | JOURNAL | TRANSACTION | TEN KEY |

Input Param

FIG. 14
INITIAL DEPOSIT SCREEN
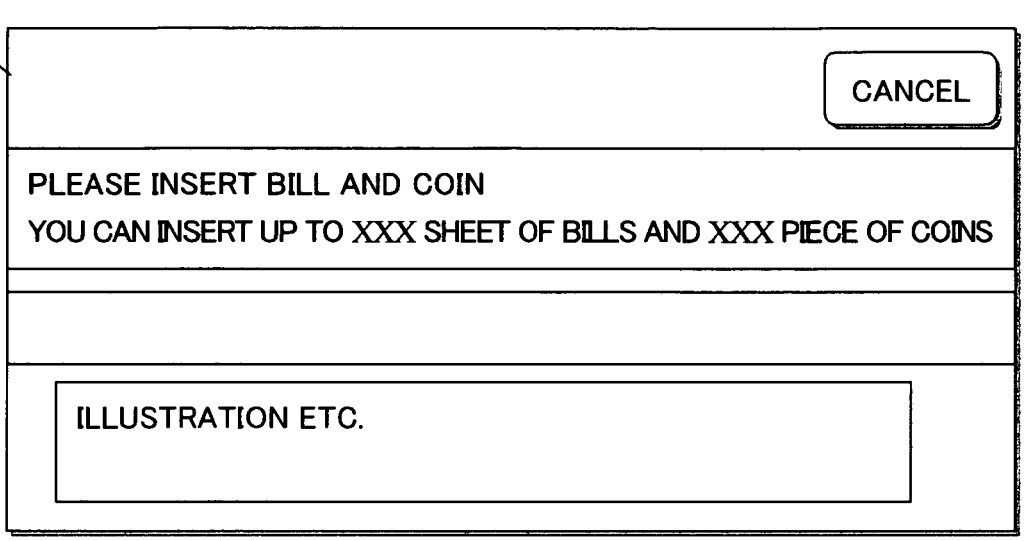
BILL INSERT SCREEN
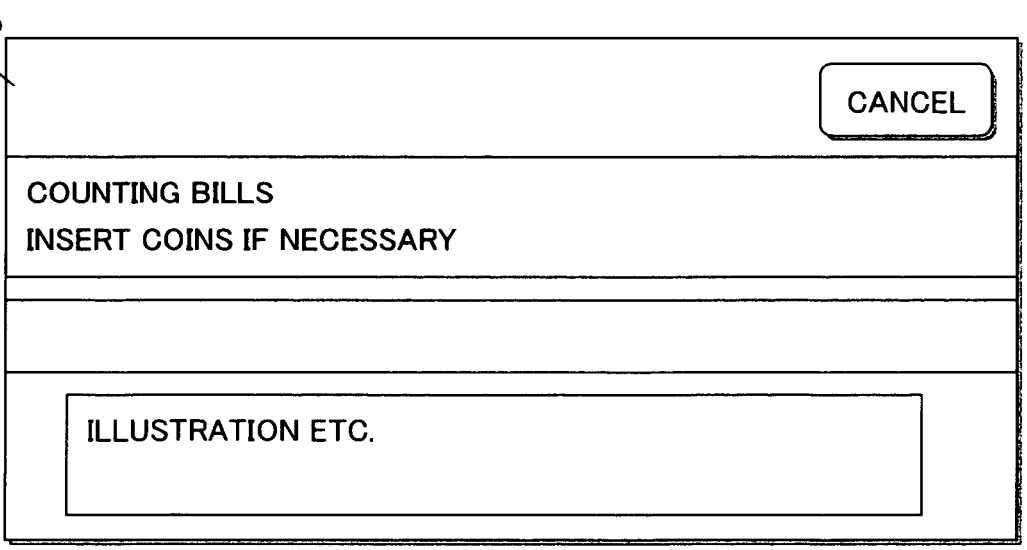

INVALID DEPOSIT RETURN

```
                                              [ CANCEL ]
RETURN MONEY
SHUTTER IS CLOSED AFTER REMOVING MONEY

TOTAL AMOUNT    XXXX YEN

ILLUSTRATION ETC.
```

FIG. 19

```
<HTML>
<HEAD>
<TITLE> Web ATM Sample</TITLE>
<META http-equiv="Content-Type" content="text/html; charset=shift_jis">
</HEAD>
<BODY background="http://webatm:8080/webatm/xxx.bmp">

// SPECIFY Agent which is called up in the screen
<APPLET CODE="U_agtSync_insertCash.insertCash" CODEBASE="http://webatm:8080/webatm"
    WIDTH=0 HEIGHT=0 NAME="U_agtSync_insertCash" MAYSCRIPT>
</applet>

// MAKE MAYSCRIPT definition such that POSTAgent calls up function of JavaScript
<APPLET CODE="U_agtPost" CODEBASE = "http//webatm:8080/webatm"
    WIDTH=0 HEIGHT=0 NAME="U_agtPost" MAYSCRIPT>
</applet>

// SPECIFY View Agent
<APPLET CODE="U_agtView" CODEBASE="http://webatm:8080/webatm"
    WIDTH=100 HEIGHT=100 ALIGN=LEFT HSAPCE=10 VSPACE=10 NAME="U_agtView">
<PARAM NAME=fontKind    Value="Serif">
<PARAM NAME=fontPoint   Value="14">
<PARAM NAME=fontStyle   Value="Bold">
<PARAM NAME=fontColor   Value="Red">
<PARAM NAME=fontColor   Value="Red">
<PARAM NAME=background  Value="black">
<PARAM NAME=startX      Value="10">
<PARAM NAME=startY      Value="10">
<PARAM NAME=endX        Value="100">
<PARAM NAME=endY        Value="80">
<PARAM NAME=text        Value="BILL IS BEING VALIDATED">
</applet>
```
} PARAMETER definition of ViewAgent

```
<SCRIPT language="javascript">
<!--
    // DEFINE FUNCTION which is called up from POSTAgent (requisite)
    function postFunc(postData){
        document.sys_form.ioResponse.value = postData;
        window.document.sys_form.submit();
    }
// -->
</SCRIPT>
<FORM name="sys_form" method="post" action="http://webatm:8080/webatm/main.jsp">
    ~OMIT~
    <font size=10>PLEASE INSERT BILL/COIN </font>
    <BR>
    <HR>
</FORM
<SCRIPT language="javascript">
<!--
    //CALL UP ControlAgent
    ret = document.U_agtSync_insertCash.insertCash(insertCashMode,inputParam,postMode,maxTimer);
    if(ret < 0) {
      //ABNORMAL NOTIFY PROCESS
      ~OMIT~
      }
// -->
</SCRIPT>
</BODY>
</HTML>
```

FIG. 21

```
<HTML>
<HEAD>
<META http-equiv="Content-Type" content="text/html; charset=shift_jis">
<TITLE>WebATM sample</TITLE>
</HEAD>
<BODY background="http://webatm:8080/webatm/xxx.bmp">

// SPECIFY Agent which is called up in the screen
<applet code="U_agtSync_insertCash.insertCash" codebase="http://webatm:8080/webatm"
        width=0 height=0 name="U_agtPost" MAYSCRIPT>
</applet>

// MAKE MAYSCRIPT definition such that POSTAgent calls up function of JavaScript
<applet code="U_agtPost" codebase = "http://webatm:8080/webatm"
        width=- height=p name="U_agtPost" MAYSCRIPT>
</applet>

// SPECIFY View Agent
<applet code="U_agtView" codebase="http://webatm:8080/webatm"
        width=100 height=100 align=left hspace=10 vspace=10 name="U_agtView">
</applet>

<SCRIPT language="javascript">
<!--
    // DEFINE FUNCTION which is called up from POSTAgent (requisite)
    function postFunc (postData){
        document.sys_form.ioResponse.value = postData;
        window.document.sys_form.submit();
    }

//DEFINE FUNCTION which is called up from ControlAgent (requisite)
    function insertCashFunc(eventKind, billVal, coinVal){
        switch (eventKind){
            case 1:  //START VALIDATION (BILL)
                // CALL UP ViewAgent
                ret =document.U_agtView.setFont (fontKind, fontPoint, fontStyle, fontColor, background);
                ret =document.U_agtView.showText (startX, startY, endX, endY, text);
                break;
            case 2:  //START VALIDATION (COIN)
                ~OMIT~
            case n:  //END VALIDATION (BILL/COIN)
                ~OMIT~
        }
    }
// -->
</SCRIPT>
<FORM name="sys_form" method="post" action="http://webatm:8080/webatm/main.jsp">
    ~OMIT~
    <font size=10>PLEASE INSERT BILL/COIN </font>
    <BR>
    <HR>
</FORM>
<SCRIPT language="javascript">
<!--
    //CALL UP ControlAgent
    ret = document.U_agtSync_insertCash.insertCash (insertCashMode, inputParam, postMode, maxTimer);
    if(ret < 0) {
      //ABNORMAL NOTIFY PROCESS
      ~OMIT~
    }
// -->
</SCRIPT>
</BODY>
</HTML>
```

FIG. 25

| AGENT | METHOD | | IO CONTROLLER | | | | | | | | |
|---|---|---|---|---|---|---|---|---|---|---|---|
| | | NONE | BILL | COIN | PAS BOOK | CARD | RECEIPT | JOURNAL | TRANS-ACTION | TEN KEY |
| SYNCHRONIZATION | INITIALIZE | | | | ● | ● | ● | ● | ● | ● |
| | MECHANISM RESET | | | | ● | ● | ● | ● | | |
| | BILL/COIN INSERT | | ● | ● | | | | | | |
| | MEDIUM SIMULTANEOUS EJECT | | ● | ● | ● | ● | ● | | | |
| | PRINT/FEED/MS WRITE/EJECT PREPARE | | ● | ● | ● | ● | ● | ● | | |
| | DEPOSIT RETURN | | ● | ● | | | | | | |
| | STORAGE | | ● | ● | | | | | | |
| | FORCE-EJECT/CAPTURE | | ● | ● | ● | ● | ● | | | |
| | OBTAIN UNIT INFORMATION/SET TRANSACTION STATUS/TWO-SCREEN DISPLAY | | ● | ● | ● | ● | ● | ● | ● | ● |
| | DEPOSIT/WITHDRAWAL PREPARE | | ● | ● | | | | | | |
| | FORCE REPLENISH | | ● | ● | | | | | | |
| | JAM RESET | | ● | ● | | | | | | |
| | CARD/PASSBOOK INSERT | | | | ● | ● | | | | |
| POST | POST PROCESS | ● | | | | | | | | |
| | POST DATA HOLD | ● | | | | | | | | |
| TEXT DISPLAY | FONT SET | ● | | | | | | | | |
| | TEXT DISPLAY | ● | | | | | | | | |
| | TEXT ERASE | ● | | | | | | | | |

FIG. 26

```
<HTML>
<HEAD>
<TITLE>WebATM Sample</TITLE>
</HEAD>
<BODY>

// SPECIFY AGENT WHICH IS CALLED UP IN THE SCREEN
<APPLET CODE="U_agtSync_class" codebase = "http://webatm:8080/webatm"
        WIDTH="0" HEIGHT="0" NAME="U_agtSync" >
</APPLET>

// MAKE MAYSCRIPT DEFINITION SUCH THAT POSTAgent CALLS UP FUNCTION OF Java Script
<APPLET CODE="U_agtPost.class" codebase = "http://webatm:8080/webatm"
        WIDTH="0" HEIGHT="0" NAME="U_agtPost" MAYSCRIPT>

<SCRIPT language="javascript">
<!--
    // DEFINE FUNCTION THAT IS CALLED UP FROM POSTAgent (REQUISITE)
    function postFunc(postData){ document.sys_form.ioResponse.value = postData;
                                 window.document.sys_form.submit();
    }

// CALL UP INITIAL METHOD IN SYNCHRONIZATION Agent
    ret = document.U_agtSync_initial (inputParam, parseInt(postMode), parseInt(maxTimer));
    if (ret < 0) {
        // ABNORMAL NOTIFY PROCESS
        ~OMIT~
    }
//-->
</SCRIPT>
</BODY>
</HTML>
```

FIG. 28  PRIOR ART

```
<HTML>
(PROGRAM DISCRIPTION OF SCREEN IMAGE) OMIT
<applet code=MachineIF.class codebase=MachineIF id=IDMachinesIF>
</applet> ·································· (D 1)
<script>
// INITIALIZE EACH DEVICE
FunctionInitialize{
        IDMachineIF. Initialize("Cash");
        IDMachineIF. Initialize("Card");
        IDMachineIF. Initialize("Receipt");
        IDMachineIF. Initialize("Passbook");
}
</script>
(PROGRAM DISCRIPTION OF SCREEN IMAGE) OMIT
</HTML>
```

FIG. 29  PRIOR ART

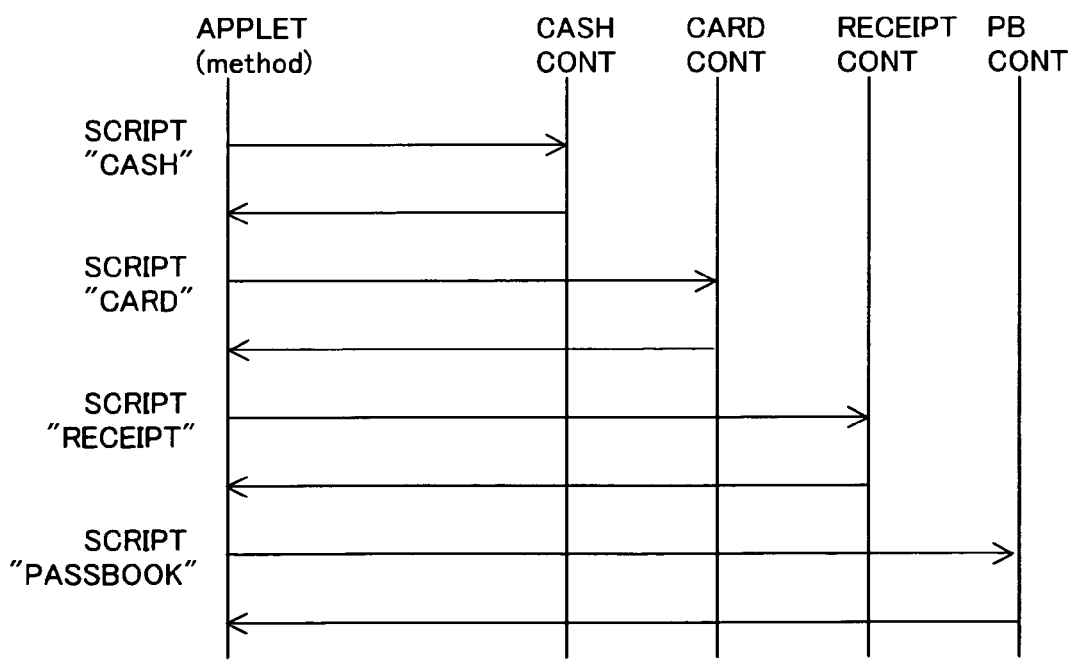

AUTOMATIC TRANSACTION APPARATUS, CONTROL METHOD OF AUTOMATIC TRANSACTION APPARATUS, AND AUTOMATIC TRANSACTION SYSTEM

CROSS-REFERENCE TO RELATED APPLICATIONS

This application is based upon and claims the benefit of priority from the prior Japanese Patent Application No. 2003-390477, filed on Nov. 20, 2003, the entire contents of which are incorporated herein by reference.

BACKGROUND OF THE INVENTION

1. Field of the Invention

The present invention relates to an automatic transaction apparatus, its control method and automatic transaction system which execute screen control and automatic transaction operation according to the screen, content transmitted from a Web server by requests, and more particularly to an automatic transaction apparatus, its control method and automatic transaction system which operate by screen content, where screen information and device control information related to the screen are embedded.

2. Description of the Related Art

Automatic transaction apparatus are used for various transactions, and in the financial field, for example, automatic withdrawal machines and automatic deposit/withdrawal machines are used, and in other fields, automatic ticket machines and automatic issuing machines are used. In such automatic transaction apparatus, automatic transaction apparatus for depositing/withdrawing, issuing tickets and outputting various information using Web technology are provided as such networks as the Internet currently develop.

FIG. 27 is a block diagram of a conventional automatic transaction system, and shows an ATM (Automatic Teller Machine) for financial operations. As FIG. 27 shows, the WWW (World Wide Web) server 300 and the automatic cash transaction apparatus 400 are connected via a network.

According to the request of the automatic transaction apparatus (ATM) 400, which is a client, the server 300 transmits the Web page (screen content) 500 to the ATM 400. This Web page is created with a program for creating a screen to be displayed on the display apparatus using a page description language (HTML, JAVA (registered trademark) script), and relating to the display content of this one page (one screen), the control program of another device (e.g. card processing device, cash processing device, pass book processing device, itemized slip processing device), for which drive is controlled, is embedded as an object.

For example, as FIG. 27 shows, the Web page 500 is comprised of a screen content 502 having a screen creation program and applet tag for specifying an object (applet) and for specifying the execution method (method) by script, using the page description language HTML (Hyper Text Markup Language), and applet 510 which sets the program for executing the method of the object (applet).

This Web page 500 is downloaded from the WWW server 300 to the browser 410 of the ATM 400 according to the request of the ATM 400. In the ATM 400, on the other hand, the ATM middleware operates under the control of a kernel (OS), and performs I/O operations.(transaction operations). The ATM 400 has a card reader/writer unit 440, receipt/journal printer 441, bill/coin processing unit 442, pass book processing unit 443 and customer operation panel as the I/O mechanical units.

According to the screen creation program of the Web page, the browser 410 displays the screen on the customer operation panel, analyzes the applet tag of the screen content 502 and the method name, executes the corresponding program of the applet 510, and issues commands to the I/O units 440–443.

In such ATM control by a Web browser, it is proposed to specify the operation method (initialization in this example) of each device using the script (Java Script) of the screen content 502 by specifying the device interface sorting section (machine ID) as an embedded object (applet) of the screen content 502 for each device (e.g. cash processing device) as shown in FIG. 27 and FIG. 28 (e.g. Japanese Patent Application Laid-Open No. 2000-298752.

In this method, the device interface sorting section 420 is specified by the applet tag of the screen content 502, and the device sorting section 420 sequentially reads the script, decodes it, sorts it to the interface sections 430–433 which handles the operation instructions, and operates the corresponding I/O units 440–443.

This example shows the case of the device initialization operation command, so as FIG. 29 shows, the Initialize ("cash") Script in the screen content 502 is read, the initialization command is sent to the controller of the cash processing device 442, the initialization completion reply is received, then the Initialize ("card") Script is read, the initialization command is sent to the controller of the card processing device 440, and the initialization completion reply is received. Hereafter Initialize (x) Script is sequentially read, the initialization command is sent to the controller of the corresponding processing device, the initialization completion reply is received, and processing ends.

In this proposal, when ATMs with the same functions are controlled via the Web, a plurality of units can be operated by one applet tag of the screen content, the description of the HTML of the screen content can be short, and the embedded object can be simple.

However in Web control, the request must be sent from the ATM to the Web server each time the screen is changed in order to implement dynamic content. In the case of automatic transaction processing, the user must perform a plurality of operations, therefore a guide display for each of the operations is necessary.

Because of this, in the case of prior art, the number of requests from the ATM required for one transaction is high, so along with this, the number of times of communication with the Web server increases and the communication time and communication cost also increase. Also normally the Web server controls many ATMs, so load on the Web server increases, download wait time at the ATM (client) increases, and transaction processing takes time.

Also many ATMs do not have the same functions, but have different functions. For example, some process bills and coins as a cash processing function, but other process only bills, some perform passbook processing which other do not, and some perform deposit/withdrawal processing and other perform withdrawal processing only.

In order to control such ATMs with different functions by the Web, the Script itself of the screen content must be changed dramatically according to the constituting functions or units, even if the applet tag is the same, since the method to be called up is for each unit. In other words, it is necessary to design the description of the screen content according to the difference of the constituting functions and units of the ATM to be controlled.

Because of this, enormous labor is required for developing a Web page on the WWW server 300, and it takes time to add a new function (e.g. link function with a portable telephone).

SUMMARY OF THE INVENTION

With the foregoing in view, it is an object of the present invention to provide an automatic transaction apparatus, control method of the automatic transaction apparatus, and automatic transaction system for decreasing the number of times of requests required for one transaction.

It is another object of the present invention to provide an automatic transaction apparatus, control method of the automatic transaction apparatus, and automatic transaction system for the applet to perform processing which makes issuing a request to the Web server unnecessary, so as to decrease the communication time and decrease the time required for automatic transaction.

It is still another object of the present invention to provide an automatic transaction apparatus, control method of the automatic transaction apparatus and automatic transaction system for an applet to execute processing when issuing a request to a Web server is unnecessary, so as to decrease the number of times of requests.

It is still another object of the present invention to provide an automatic transaction apparatus, control method of the automatic transaction apparatus, and automatic transaction system for an applet to execute screen update processing, so as to decrease the number of times of requests.

To achieve these objects, the automatic transaction apparatus of the present invention is an automatic transaction apparatus for communicating with a Web server, and performing guide display and transaction operation according to the operation of a user, having a display unit for performing the guide display, a plurality of I/O units for performing the transaction operation, and a control unit for controlling the guide display of the screen of the display unit according to a screen content from the Web server, and controlling the plurality of I/O units according to objects embedded in the screen content. And the control unit controls the sequence of the I/O units by the scripts of the objects, and updates a display message of the display unit according to the sequence control.

The control method of an automatic transaction apparatus of the present invention is a control method of an automatic transaction apparatus for communicating with a Web server and performing guide display and transaction operation according to the operation of a user, having a step of performing guide display on the screen of a display apparatus according to a screen content from the Web server, a step of controlling the sequence of I/O units according to objects embedded in the screen content, and a step of updating a display message of the display unit according to the sequence control of the I/O units using the objects.

The automatic transaction system of the present invention has a Web server and an automatic transaction apparatus which communicates with the Web server and performs guide display and transaction operation according to the operation of a user. And the automatic transaction apparatus has a display unit for performing the guide display, a plurality of I/O units for performing the transaction operation, and a control unit for controlling the guide display of the screen of the display unit according to the screen content from the Web server, and controlling the plurality of I/O units according to objects embedded in the screen content, and the control unit controls the sequence of the I/O units by the Scripts of the objects, and updates a display message of the display unit according to the sequence control.

In the present invention, it is preferable that the control unit has a browser which interprets the applet tag of the screen content from the Web server, and performs the guide display, and also interprets the applet tag of the objects embedded in the screen content, and calls up a method for each processing for controlling the I/O units. And the browser controls the sequence of the I/O units and updates the display messages of the display unit according to the sequence control.

In the present invention, it is preferable that the control unit performs communication between the applet of the object and the applet of the screen, and updates the display messages of the display unit.

In the present invention, it is preferable that the control unit calls up a function of the script by the applet of the object, and updates the display messages of the display unit.

In the present invention, it is preferable that the control unit calls up the method for each processing for controlling the synchronization of the plurality of I/O units according to the Scripts of the objects embedded in the screen content, and controls the synchronization of the plurality of I/O units.

In the present invention, it is preferable that the I/O unit has a cash unit for at least receiving cash, validating the received cash, and depositing the cash, and the control unit interprets the script of the screen content and updates the display messages of the display unit according to the operation of the cash unit.

In the present invention, it is preferable that the control unit sends the request to the Web server after executing the initial deposit and additional deposit.

In the present invention, the screen is updated not by downloading all the updates of the screen from the Web server, but by updating a part of the screen using the applet and script of the screen content, so the screen can be updated without communicating with the Web server.

Therefore the number of times of requests to the Web server 100 is reduced, the number of times of communication and the communication time can be decreased, the transaction performance (speed) of the automatic transaction apparatus can be improved, and load of the Web server can be decreased.

BRIEF DESCRIPTION OF THE DRAWINGS

FIG. 6 is a table showing the transaction commands of the common interface in FIG. 3 and FIG. 5;

FIG. 7 is a table showing the agents in FIG. 3 and FIG. 4;

FIG. 8 is a table showing other agents in FIG. 3 and FIG. 4;

FIG. 9 shows the screen content in FIG. 3 and FIG. 4;

FIG. 10 is a diagram depicting the I/O control operation by the agent in FIG. 3 and FIG. 4;

FIG. 14 is a diagram depicting the first guide screen update operation according to an embodiment of the present invention;

FIG. 19 shows a screen content description example according to the embodiment in FIG. 18;

FIG. 21 shows a screen content description example according to the embodiment in FIG. 20;

FIG. 25 is a table showing the agents according to another embodiment of the present invention;

FIG. 26 shows the screen content according to another embodiment of the present invention;

FIG. 28 shows the screen content of conventional Web control; and

FIG. 29 is a diagram depicting the sequence of the I/O control operation by the script of conventional screen content.

DESCRIPTION OF THE PREFERRED EMBODIMENTS

Embodiments of the present invention will now be described in the sequence of automatic transaction system, I/O control mechanism by Web control, automatic transaction processing using Agent, method of decreasing number of times of requests by Agent, automatic transaction processing with less number of times of requests, and other embodiments.

[Automatic Transaction System]

Figure 1:
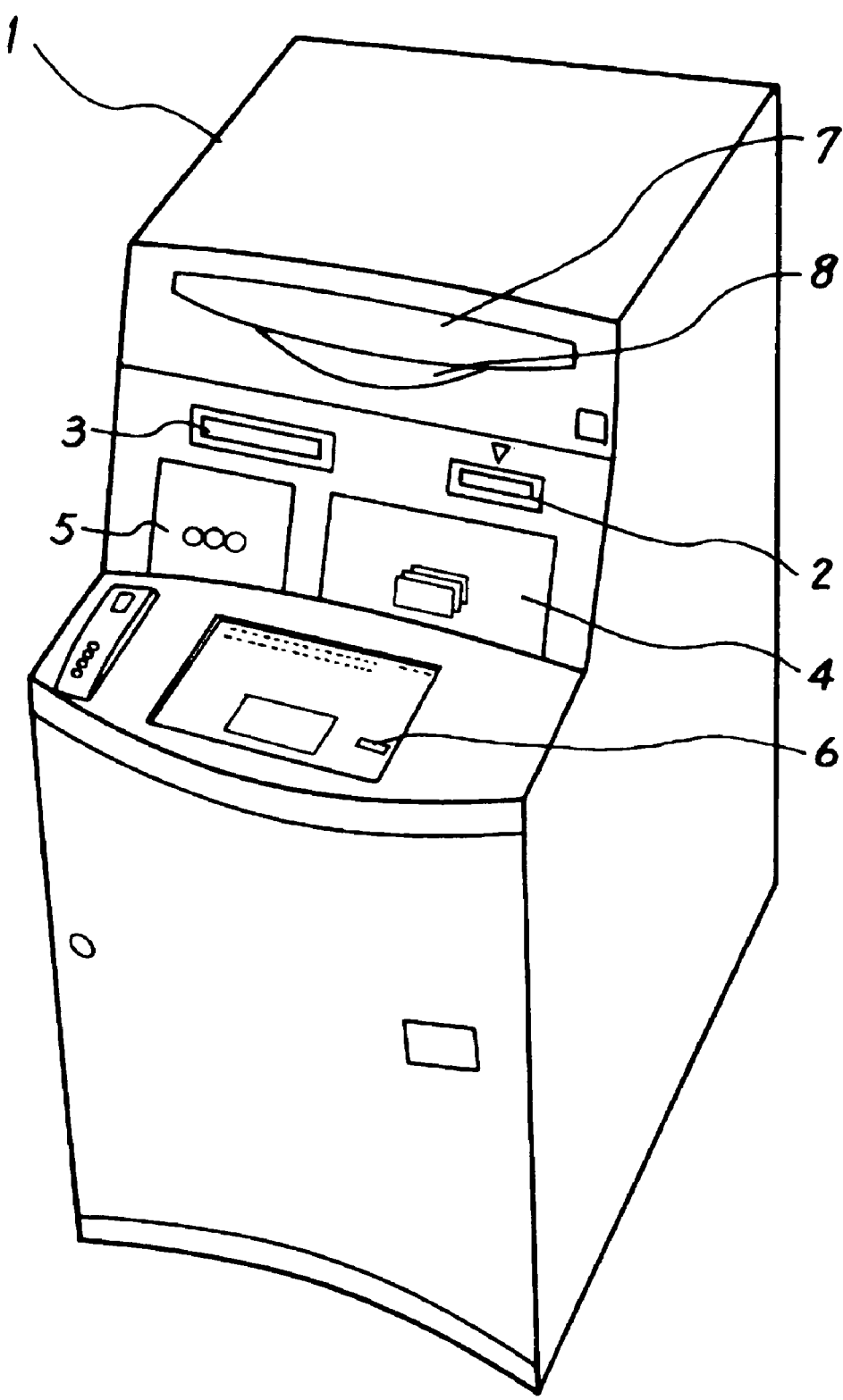
FIG. 1 is an external view of the automatic transaction apparatus according to an embodiment of the present invention.
Figure 2:
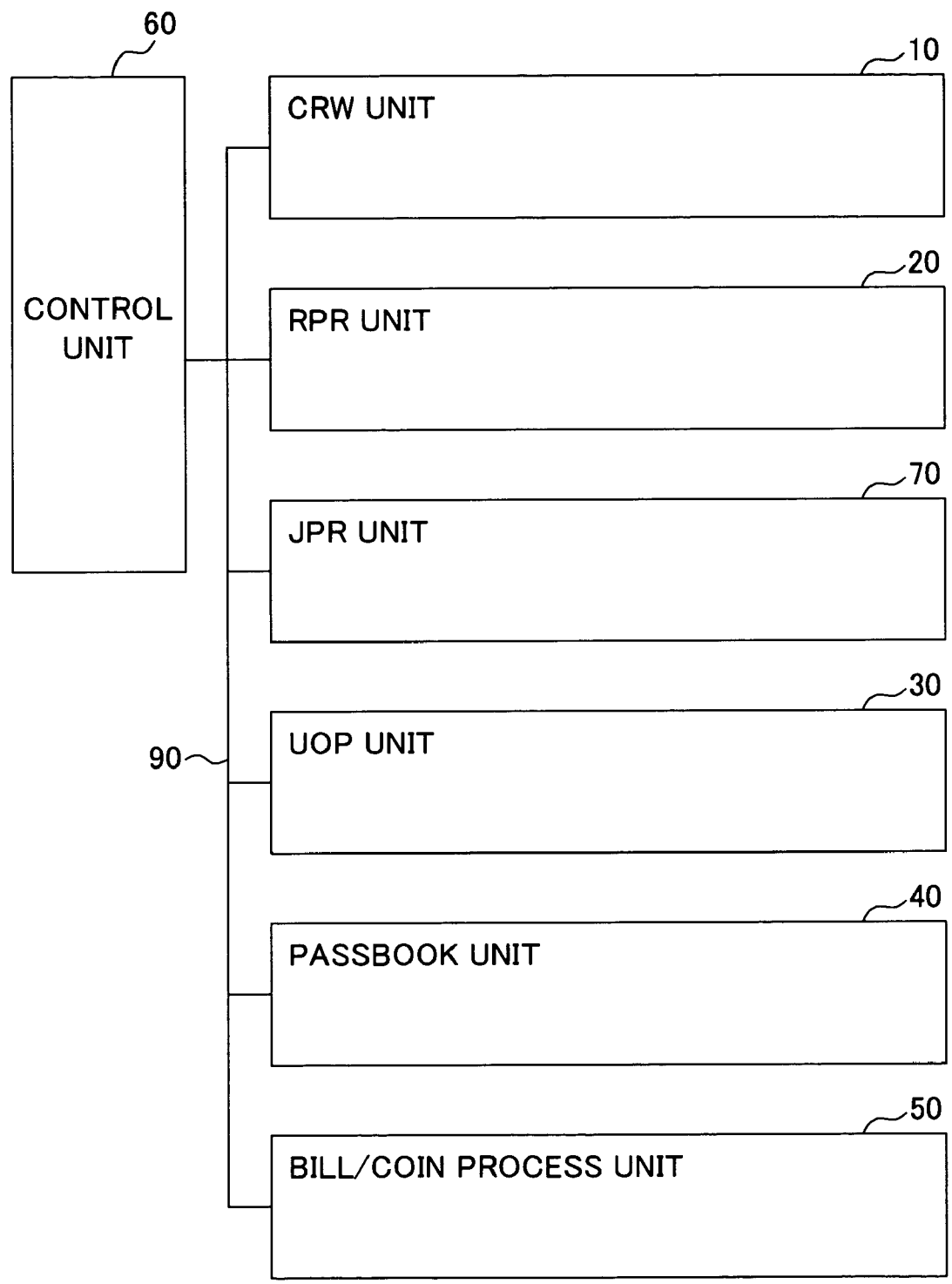
FIG. 2 is a block diagram depicting the automatic transaction apparatus of FIG. 1.
Figure 3:
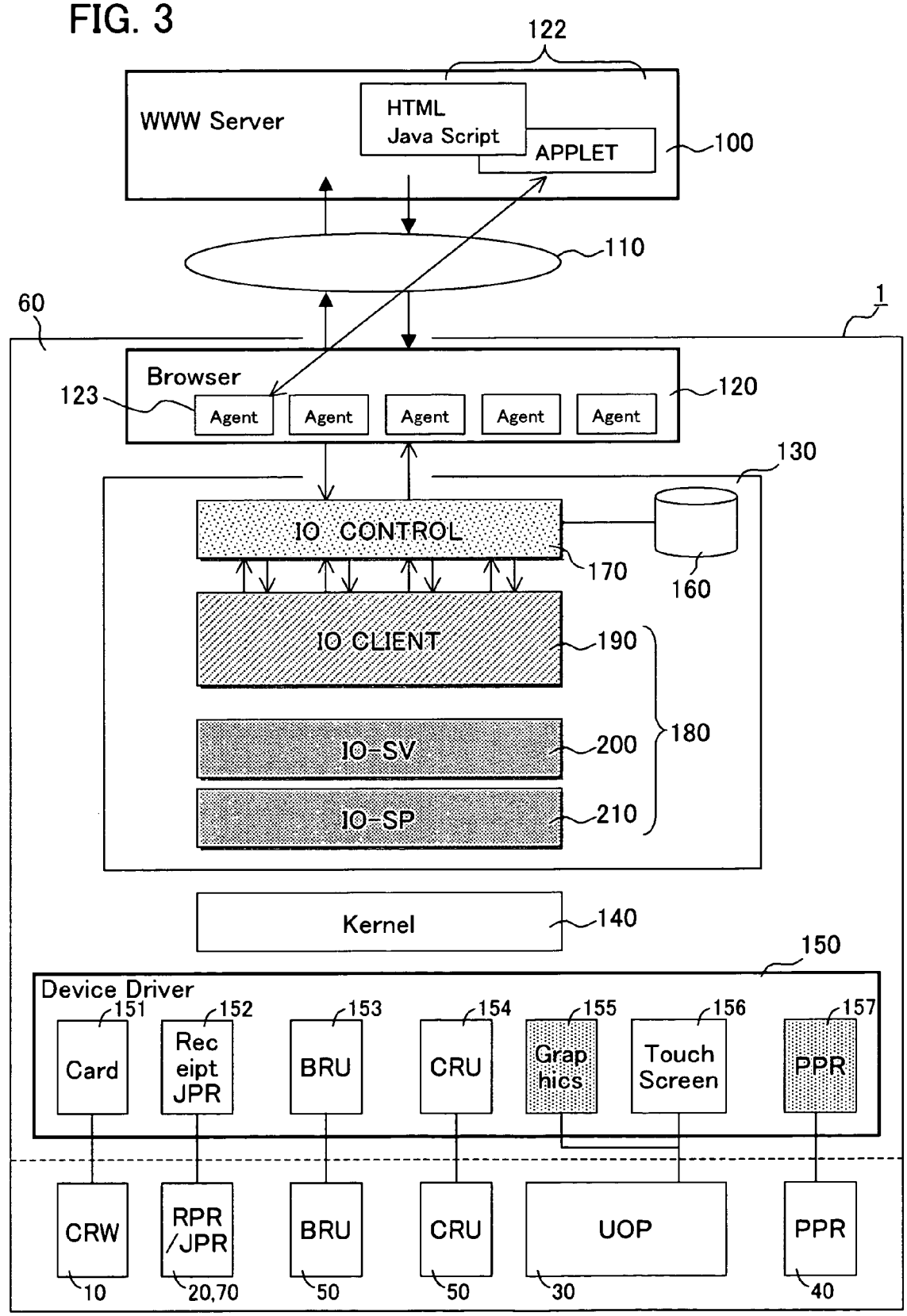
FIG. 3 is a system block diagram depicting the automatic transaction system according to an embodiment of the present invention.

FIG. 1 shows an external view of an automatic transaction apparatus according to an embodiment of the present invention, FIG. 2 is a block diagram depicting the automatic transaction apparatus in FIG. 1, and FIG. 3 is a system block diagram depicting the automatic transaction system according to an embodiment of the present invention.

As FIG. 1 shows, the automatic transaction apparatus 1 comprises a card entry 2 for inserting and ejecting a magnetic card, a pass book entry 3 for inserting and ejecting a magnetic pass book, a bill entry 4 for entering and ejecting bills, a coin entry 5 for entering and ejecting coins, a UOP (User Operation Panel) 6 for a user to operate, an operation display 7 for displaying the operation status to the user, and a customer sensor 8 for detecting the user.

FIG. 2 is a block diagram depicting the automatic transaction apparatus 1 in FIG. 1. The CRW (Card Reader Writer) unit 10 reads the magnetic card by the magnetic head, and returns it to the entry 2, while transporting the magnetic card inserted from the card entry (card insertion slot) 2 using a transport mechanism, which is not illustrated. The CRW unit 10 has an image sensor so as to read the magnetic card (embossed section) optically.

The RPR (Receipt Printer) unit 20 prints the transaction result on the receipt paper by the print head, and ejects the receipt to the card entry 2. The RPR unit 20 stores the receipt returned from the entry 2 when the ejected receipt is not removed by the user within a predetermined time.

The JPR (Journal Printer) unit 70 prints out the transaction status and the result on the journal printer by the print head. The UOP (User Operation Panel) unit 30 is comprised of the UOP (display with touch panel) 6 and the control circuit thereof. The pass book (PPR) processing unit 40 reads the magnetic pass book inserted from the pass book entry 3, prints the transaction on the magnetic pass book, and ejects the pass book from the pass book entry 3.

The bill/coin processing unit 50 performs the deposit operation by validating the bills and the coins entered through the bill entry 4 and the coin entry 5, counting them and storing them in stackers, and performs withdrawal operation for taking off the requested bills and coins from the cash stacker, and releasing them to the bill entry 4 and the coin entry 5.

The control section 60 is connected to these control, units 10, 20, 30, 40, 50 and 70 via such a network 90 as a LAN, and performs automatic transaction processing based on the software configuration, which is mentioned later in FIG. 3.

FIG. 3 is a block diagram of the automatic transaction system according to an embodiment of the present invention. The automatic transaction apparatus 1 exchanges commands, parameters and data required for the transaction processing with the WWW (World Wide Web) server (host) 100 via such a network 110 as the Internet.

In the automatic transaction apparatus 1, the above mentioned control section 60 has the browser 120, ATM middleware 130, kernel (OS) 140 and device driver 150.

The device driver 150 is comprised of a card unit driver 151 for driving the card (CRW) unit 10, a receipt/journal unit driver 152 for driving the receipt/journal units (RPR/JPR) 20 and 70, a BRU driver 153 for driving the BRU (bill) unit 50, a CRU driver 154 for driving the CRU (coin) unit 50, a graphic driver 155 for driving the UOP 30, a touch screen driver 156, and a PPR driver 157 for driving the pass book unit 40.

The browser 120, which is a Web browser, such as Internet Explorer (Microsoft trademark), requests the Web server 100 to transmit content, and interprets and displays the screen content (Web page) transmitted by the Web server 100. In this case, the browser 120 requests the Web page required for the transaction processing, which is constructed by HTML and Java Script, interprets the transmitted Web page, and controls the ATM middleware 130 and the screen of the UOP 30.

The kernel 140 is a known OS (Operating System), such as Windows® and Linux, and under the operating environment of the kernel 140, the browser 120, ATM middleware 130 and device driver 150 operate.

The ATM middleware 130 is comprised of a parameter file 160, I/O control layer 170, I/O client layer 190, I/O server layer 200 and I/O service provider layer 210.

This I/O client layer 190 is for controlling an individual I/O unit installed in the apparatus, where the I/O server layer 200 starts up and ends an I/O operation and controls the communication protocol, and the I/O service provider layer 210 converts the messages for each I/O unit. These are conventional middleware 180, which were designed according to the functional range and the type of the apparatus and to the specifications of the connected I/O unit.

The I/O control layer 170, on the other hand, transmits/receives commands and data using the common application interface protocol of the Web server 100 and the middleware. The functional ranges of the ATM 1 are different from each other depending on the model of the apparatus, so the common application interface (API) is comprised of common commands and data systems that can operate all models, which will be described later in FIG. 6.

The I/O control layer 170 integrates the application interface (API) of the I/O client layer 190, and constructs a more abstract common API. The parameter file 160 is for storing the input parameters/fixed parameters which are uniquely determined by the system specifications specific to the vender (ATM manufacturer).

The I/O control layer 170 calls up parameters specific to each I/O client layer 190 from this parameter file 160 when calling up the I/O client layer 190, and converts the common API into the conventional client API.

By this, the highly abstract common API can be converted into a client API, matching the ATM middleware 190 of the automatic transaction apparatus 1 and the type of the installed I/O units, and the conventional ATM middleware 180 and the I/O unit can be operated. In other words, a conventional ATM middleware can be customized so as to operate with a common API.

As FIG. 3 shows, in the present invention, the agent 123 defined for each processing of the ATM is embedded as an applet of the screen content 122 of the Web page, and operation of the I/O units required for processing are controlled for each processing.

Details will be described in FIG. 4 and later, but the applet name is defined for each processing, such as synchronization control and initialization control of synchronization control (hereafter called Agent), and the method is also provided for each processing. In other words, an applet (Agent) having a method for controlling the operation of the I/O unit corresponding to the processing is provided, and the applet (Agent) and the method are specified for each processing.

By this, even if a plurality of units operate synchronously, the operation can be executed for each processing, and the applet name can be assigned for each processing, so the changed locations of a Web page can be decreased in the Web control of ATMs with different functions, and a Web page can be easily created even in complicated automatic transaction control.

Since a plurality of I/O units can be controlled merely by calling up one method, a plurality of I/O units can be controlled in parallel, processing speed can be increased accordingly, the ATM control time can be decreased even if Web control is used, and the wait time for a user can be decreased.

[I/O Control Mechanism by Web Control]

Now the I/O control mechanism by Web control will be described. FIG. 4 is a block diagram depicting the Web browser and the I/O controller in the configuration in FIG. 3, FIG. 5 is a block diagram depicting the ATM middleware in the configuration in FIG. 3, and FIG. 6 is a table showing the common API commands in FIG. 3 and FIG. 4.

Figure 4:
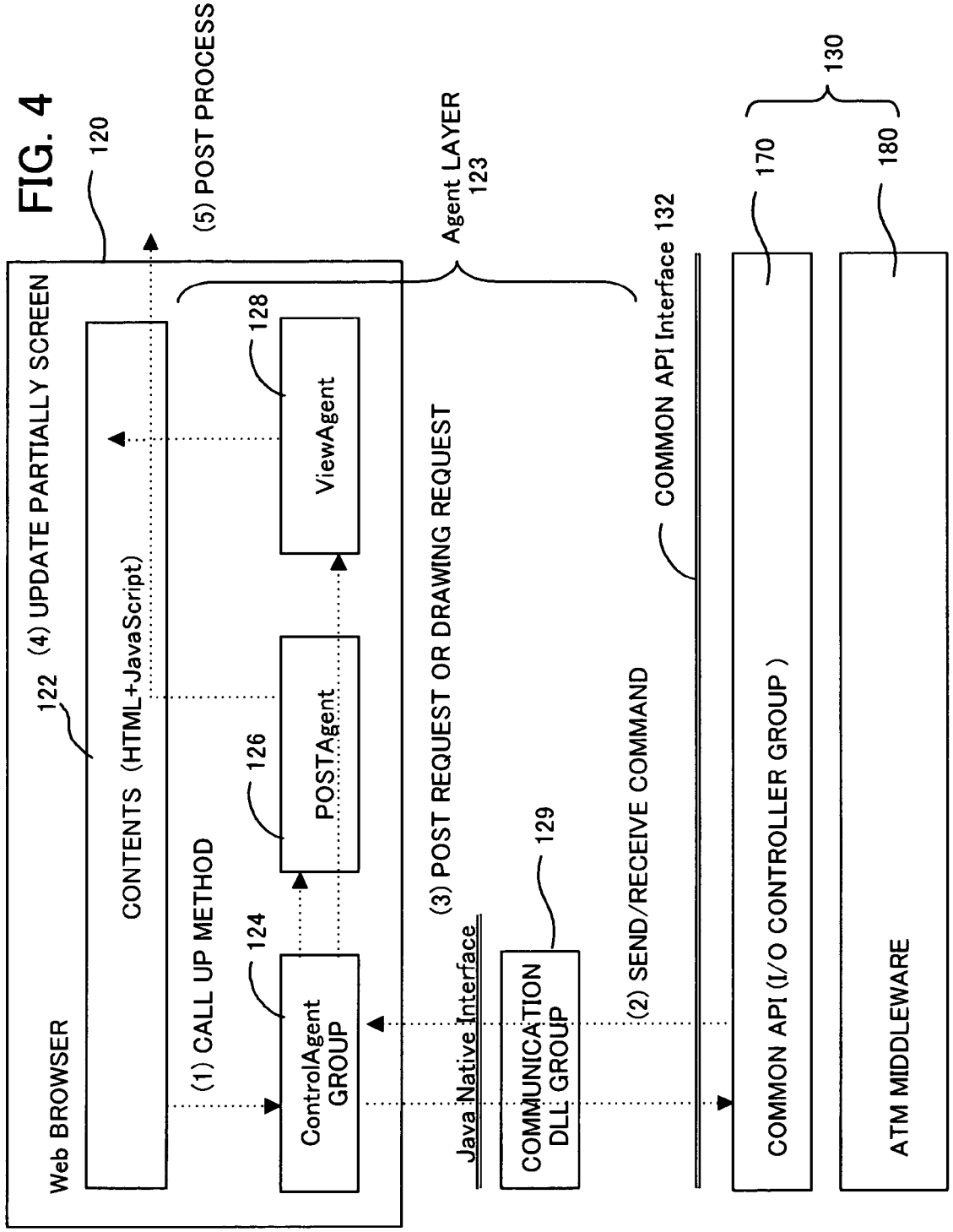
FIG. 4 is a diagram depicting the browser and screen content in FIG. 3.
Figure 5:
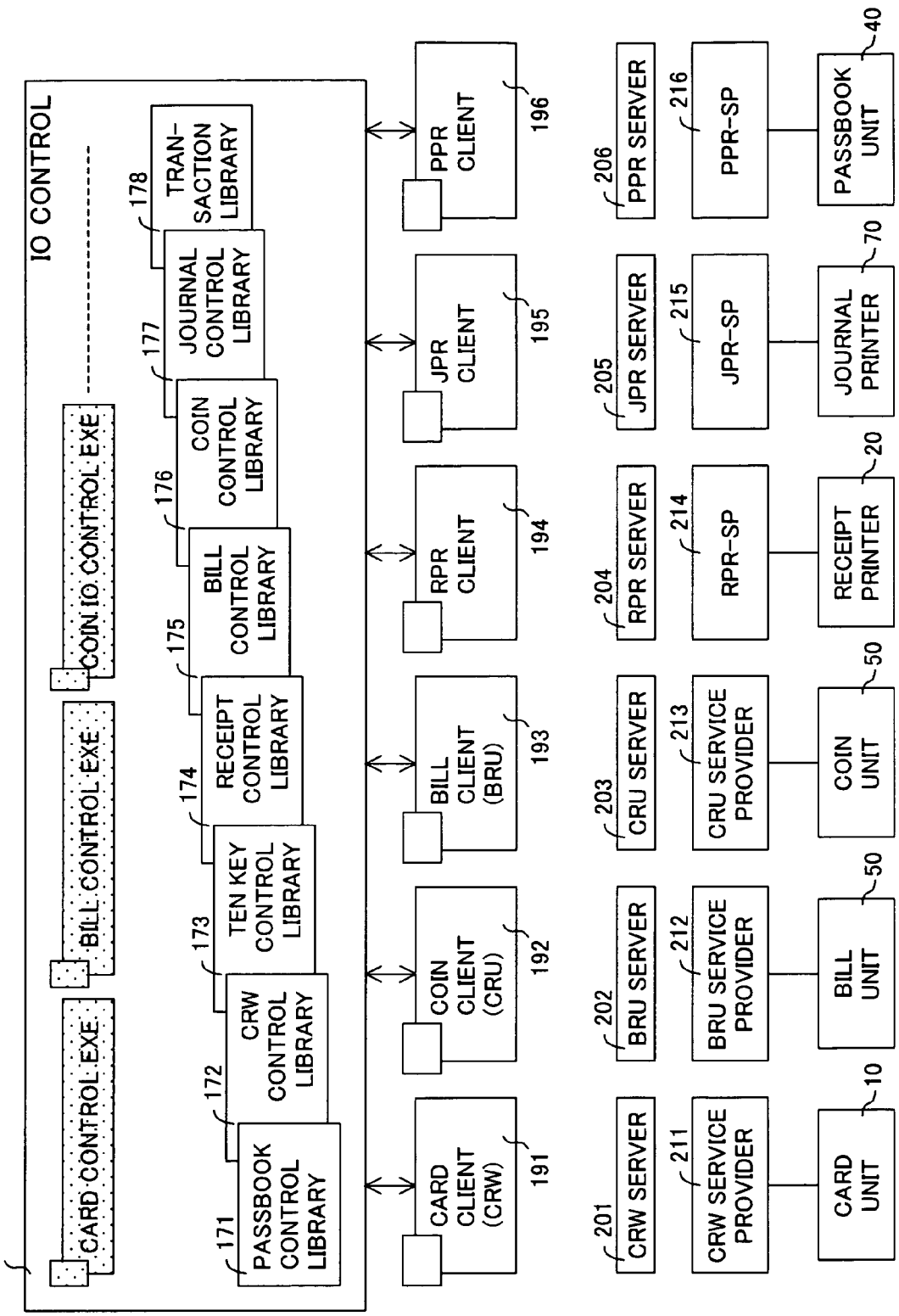
FIG. 5 is a block diagram depicting the ATM middleware in FIG. 3 and FIG. 4.

As FIG. 4 shows, the screen content (HTML+Java Script) 122 and the Agent (applet) 123 are downloaded from the WWW server 100 to the Web browser 120. The Agent 123 is comprised of the control Agent group 124 for controlling each unit, POST Agent 126 for performing post processing, View Agent 128 for constructing the screen, and communication DLL (Dynamic Link Library) 129 for communicating with the I/O controller 170 via the Java Native Interface and the common API interface 132.

If the interfaces are the same, then the communication DLL group 129 is unnecessary. For the control Agent group 124, only the control agents required for the display screen are downloaded. As described in detail in FIG. 7 and later, the control agent is constructed for each ATM transaction processing.

In the operation of the configuration in FIG. 4, the method of the control Agent 124 is called up by the method name described in the Java Script of the screen content 122. The called up method issues a command to the I/O controller 170 via the communication DLL group 129.

The I/O controller 170 operates the corresponding unit via the ATM middleware 180, and receives the operation completion notice. The I/O controller 170 replies the command execution result to the control Agent 124. The control Agent 124 sends the post request or drawing request to the POST Agent 126 for executing post processing or to the View Agent 128 for updating the screen, and has either POST processing or screen update processing executed.

Before describing this Agent, the common API will be described first. FIG. 6 shows an example of the command types of the common API. As CRW (Card Reader/Writer) commands, a card insertion command and a card ejection command are provided.

As RPR (Receipt Printer) commands, a printing command, release command and other commands are provided. As PPR (Pass book Printer) commands, a pass book insertion command, printing command, MS (Magnetic Stripe) write command, pass book ejection command, auto turn page command and other commands are provided.

As BRU (Bill Recycle Unit) commands, an initialization command, acceptance/counting command, storing command, deposit return command, feeding command, release command, capturing command, transport path check command, jam reset command and other commands are provided. The CRU (Coin Recycle Unit) commands are the same [as the BRU commands], for which description is omitted.

The configuration of the ATM middleware 130 in FIG. 3 and FIG. 4 will now be described with reference to FIG. 5. The I/O control layer 170 has the I/O control library group (I/O controllers) 171–178 for controlling each I/O.

In this case, the I/O control library group is comprised of the pass book control library 171, CRW control library 172, ten key control library 173, receipt control library 174, bill control library 175, coin control library 176, journal control library 177 and transaction control library 178.

These control libraries 171–178 are called up by a task (e.g. card control EXE) specified by the common API, and converts the task into the client API of conventional middleware using the above mentioned parameter table 160.

The I/O client layer 190 of the conventional middleware 180 is for controlling an individual I/O unit installed in the apparatus, and in this case, the card (CRW) client 191, coin client 192, bill client 193, RPR client 194, JPR client 195 and PPR client 196 are provided.

In the same way, the I/O server layer 200 is also divided into individual I/O units for starting and ending an individual I/O operation, and controlling the communication protocol. In other words, the card (CRW) server 201, coin server 203, bill server 202, RPR (Receipt Printer) server 204, JPR server 205 and PPR (pass book printer) server 206 are provided.

In the same way, the I/O service provider layer 210 is also divided into individual I/O units for converting the messages for each I/O unit. In other words, the card (CRW) service provider 211, coin service provider 213, bill service provider 212, RPR service provider 214, JPR service provider 215 and PPR service provider 216 are provided.

In other words, the control library, the client, the server and the service provider which constitute the ATM middleware are provided corresponding to each I/O unit, and the I/O control layer 170 converts the requested commands and the parameters of the common API into the commands and the parameters of the conventional middleware API, and operates the I/O unit via the conventional middleware.

Now the above mentioned Agent will be described with reference to FIG. 7 and FIG. 8. As FIG. 7 shows, the synchronization Agent is a program for controlling the synchronization of a plurality of I/O units. In this example, an Agent and a method are integrated and as a synchronization control Agent/method (program), initialization, mechanism reset, bill/coin insertion, medium simultaneous ejection, printing/feeding/MS write/ejection preparation, deposit return, storing, forced ejection/capturing, unit information acquisition/transaction status setting/two-screen display control, deposit/withdrawal preparation, forced replenishment, jam reset and card/pass book insertion and other are provided.

Each synchronization control Agent/method issues a command to the I/O controller (that is, I/O unit) indicated by a black dot in FIG. 7, and receives a reply on the command execution result. For example, the initialization Agent/method of synchronization control issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

In the same way the mechanism reset Agent/method of synchronization control issues the mechanism reset command to the bill controller 175, coin controller 176, pass book controller 171, card controller 172, receipt controller 174 and the journal controller 177 (see FIG. 5), has each controller execute mechanism reset processing, and receives the mechanism reset processing result from each controller as the reply.

In the same way, the bill/coin insertion Agent/method of synchronization control issues the insertion command to the bill controller 175 and coin controller 176 (see FIG. 5), has each controller execute insertion processing, and receives the insertion processing result from each controller as the reply.

In the same way, as the POST Agent, the POST processing method and the POST data holding method are provided.

Also as the View (text display) Agent, the font setting method, text display method and text erasing method are provided.

Also as FIG. 8 shows, the applet for controlling a single I/O unit as well, is defined as an Agent for being controlled in a same architecture. In other words, as FIG. 8 shows, the bill control Agent, pass book control Agent, card control Agent, receipt control Agent, transaction control Agent and ten key Agent are provided.

The bill control Agent has an acceptance/counting method, storing method, deposit return method, releasing method and cancellation method for controlling each bill controller 175. The pass book control Agent has a line set/page mark read method, MS (Magnetic Stripe) read method, auto turn page method, page check auto turn method and pass book configuration information setting method for controlling each pass book controller 171.

The card control Agent has a card insertion method, cancellation method, money transfer card printing method, money transfer card issuing method and ejection preparation method for controlling each card (CRW) controller 172. The receipt control Agent has an overlay registration method and ejection preparation method for controlling each receipt controller 174.

In the same way, the transaction control Agent has a transaction information setting method, device status monitoring method, device status acquisition method, operation information setting method and cancellation method for controlling each transaction controller 178. The ten key Agent has a ten key input start method and ten key input end method for controlling each ten key controller 173.

The Web operation to call up these Agents and methods will be described with reference to FIG. 9 to FIG. 12. FIG. 9 shows the screen content to be transmitted by the Web server 100, and FIG. 10 is a diagram depicting the I/O control by the screen content in FIG. 9.

As FIG. 9 shows, the Agent name to be called up in the screen is specified in the screen content described with HTML (page description language). As an example, the initialization Agent of the synchronization control (Sync) is called up here by the applet tag <APPLET CODE="U_agtSync_initial.class".

Also by the description <SCRIPT Language="javaScript>, the call-up of the method of the initialization Agent of the synchronization control is specified using Java Script. In other words, the call-up of the initialization agent/method of the synchronization control Agent is specified by the description ret=document.U_agtSync_initial. Here the details of the screen display content are omitted.

When this screen content is downloaded to the browser 120, the synchronization control Agent is specified by the applet tag, as shown in FIG. 10, and the initialization method is called up by the call-up method name of the SCRIPT.

As described above, the called up initialization method issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

Figures 11, 12:
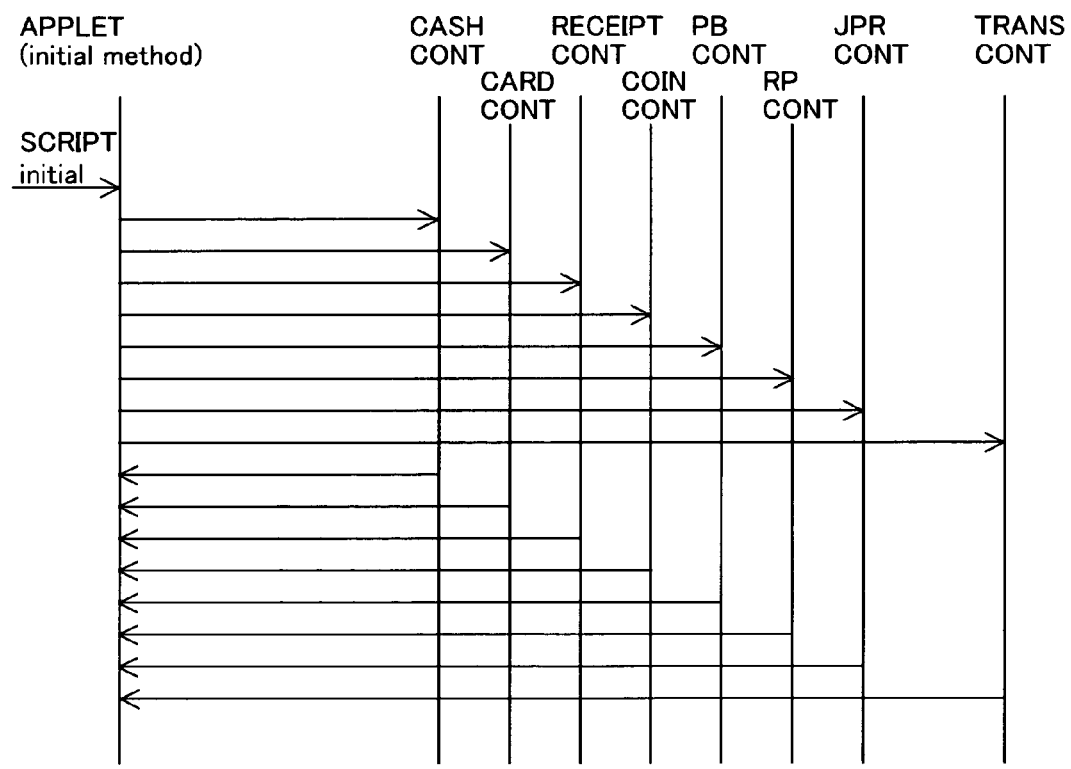
FIG. 11 is a diagram depicting the input parameters of the screen content in FIG. 9.
FIG. 12 is a diagram depicting the operation of the method of the agent in FIG. 10.

In this case, as FIG. 12 shows, the called up initialization method continuously issues the initialization command to the bill controller 175, coin controller 176, pass book controller 171, card controller 172, receipt controller 174, journal controller 177, transaction controller 178 and ten key controller 173 (see FIG. 5), and receives the replies from these controllers sequentially as the processing completes.

Therefore the I/O units can be controlled in parallel, and even a plurality of I/O units can be controlled in a short time. Whereas in the case of the method of specifying a method for each I/O unit using conventional Script, which is a sequential control for issuing commands and receiving replies sequentially for each Script, it takes time to control the I/O by the Web, as shown in FIG. 29.

Also the above mentioned Agent is provided for each processing to which a processing unit name is assigned, so ATMs with various functions can be supported with the same applet tags and method names merely by slightly changing the content of this processing unit. In this example, the content of the processing unit is changed by changing the initial (input Param) in the parenthesis of the method name of the above mentioned method call-up SCRIPT in FIG. 9. In other words, as FIG. 11 shows, the input Param is comprised of several bytes of bit information (8-bit information in FIG. 11) for setting the input flag for each I/O controller (bill, coin, pass book, card, receipt, journal, transaction control and ten key).

The input flag indicates that the input of the method to the I/O controller where "1" is set is enabled. The called up method refers to this input flag, and determines the I/O controller to which the command is issued. Therefore even ATMs with different functions can execute a same processing with a same applet tag and method name by operating the input flag in the Web server 100.

For example, if the input flag of coins is set to "0" in a transaction apparatus which does not handle coins, issuing a command to the coin controller can be prevented. In the same way, if the pass book input flag is set to "0" in a transaction apparatus which does not handle pass books, issuing a command to the pass book controller can be prevented.

The POST Agent is specified within this agent by ParseInt (postMode) in the parenthesis of the method name of the SCRIPT. Therefore POST processing can be smoothly executed by the agent. The data can be posted at the timing when the agent received all the command completions.

In the same way, the timeout processing is specified by ParseInt (maxTimer) in the parenthesis, the timer monitoring function is provided in Agent, and processing is interrupted at timeout when communication with the Web server 100 is not executed.

[Automatic Transaction Processing]

Figure 13:
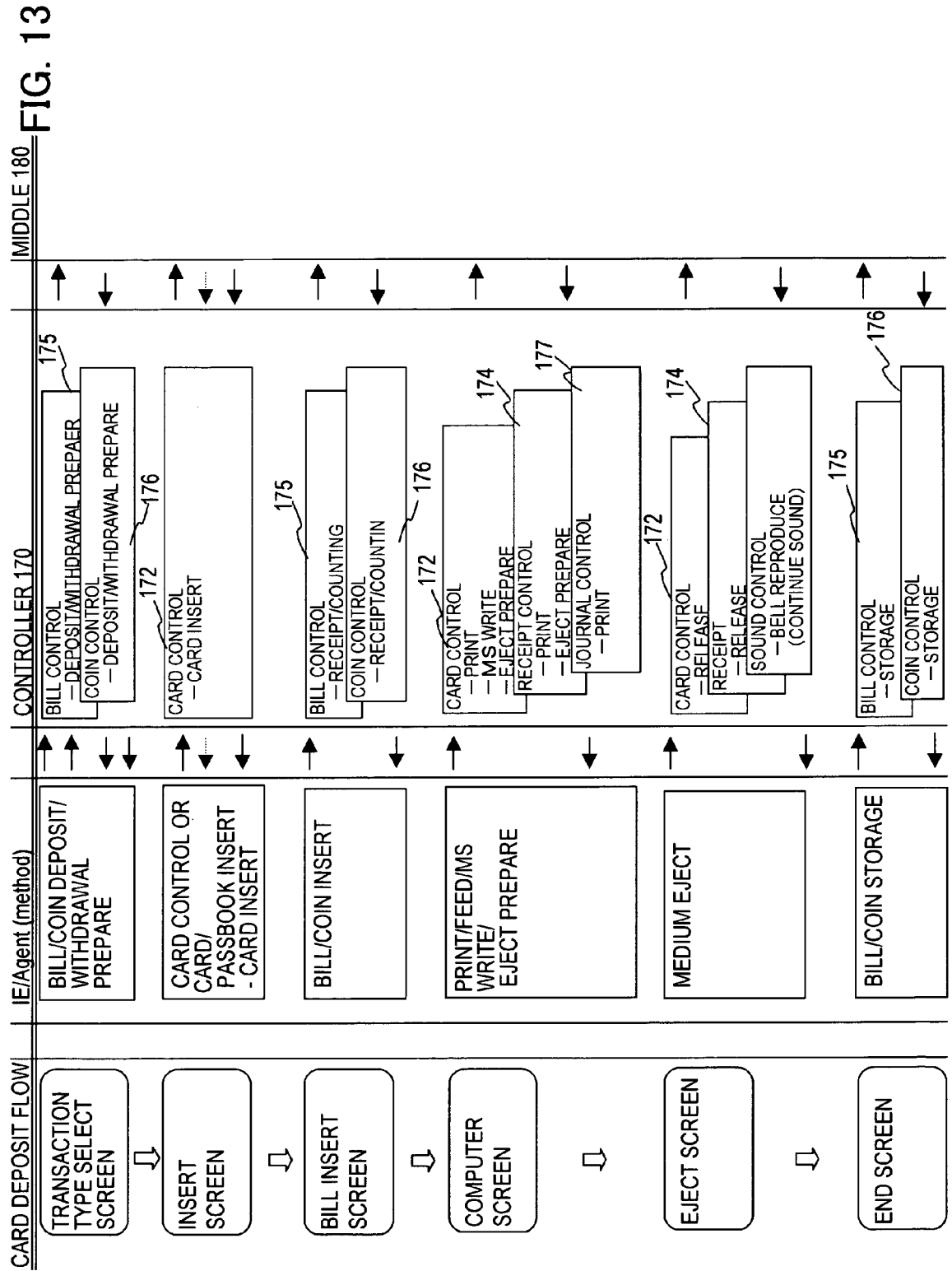
FIG. 13 is a diagram depicting the deposit processing according to an embodiment of the present invention.

Now the relationship of the screen content of the Web server 100, customer operation screen (UOP screen), Agent/method, and I/O controller will be described using the card deposit transaction in FIG. 13 as an example.

The Web server 100 issues the transaction type select screen content and applet to the ATM 1 by JSP (Java Server Pages). In the ATM 1, the browser 120 displays the transaction type select screen on the customer operation screen of the UOP 6.

And the deposit/withdrawal preparation method of the synchronization control Agent in FIG. 7 is called up by the applet name and method name embedded in the screen content, the deposit/withdrawal preparation command is issued to the bill controller 175 and the coin controller 176 to prepare for deposit/withdrawal. When deposit/withdrawal preparation completes, both controllers 175 and 176 reply the completion to the deposit/withdrawal preparation method.

If the deposit key is pressed in the type select screen of the UOP 6, this is reported to the Web server 100. By this, the Web server 100 moves to the card start processing by JSP, and issues the screen content of the insertion processing to the ATM 1. In the ATM 1, the browser 120 displays the card insertion screen on the customer operation screen of the UOP 6.

Then the card insertion method of the card control Agent is called up by the applet name card control, which is embedded in the screen content, and the method name card insertion and the card insertion command is issued to the card controller 172. The controller 172 operates the card unit 10 by the card insertion command. When the card unit 10 detects the insertion of the card and reads the card, the card control library 172 replies the completion of the card insertion to the card insertion method.

And the card insertion method requests to post the transaction status (in this case, card insertion detection and card read data), and the POST Agent 126 sends the request to the Web server 100. In this case, the synchronization Agent card/pass book insertion method is called up, and this input flag (see FIG. 11) is set at the card controller, then the same control is possible.

Then the JSP of the Web server 100 issues the screen content of the cash insertion processing to the ATM 1 by the request at the end of the card insertion processing. In the ATM 1, the browser 120 displays the cash insertion screen on the customer operation screen of the UOP 6 according to the screen content. And the bill/coin insertion method of the synchronization control Agent is called up by the bill/coin control Agent, which is an applet name embedded in the screen content, by the bill/coin insertion, which is a method name, and the acceptance/counting command is issued to the bill controller 175 and the coin controller 176.

The bill controller 175 and the coin controller 176 operate the bill unit and the coin unit 50 by the acceptance/counting command. The bill and coin units 50 opens the insertion port, detects the inserted bills and coins, closes the insertion port, and counts the inserted bills and coins. When counting ends, the bill controller 175 and the coin controller 176 replies the completion of acceptance/counting to the bill/coin insertion method. And the bill/coin insertion method requests to post the transaction status (number of accepted bills/coins and total amount), and the POST Agent 126 sends the request to the Web server 100.

Then the JSP of the Web server 100 moves to deposit processing, such as a balance update, by the request at the end of cash insertion processing, issues the screen content of the computer processing to the ATM 1, and displays the "Please Wait" screen on the customer operation screen of the UOP 6.

And the browser 120 calls up the printing/feeding/MS write/ejection preparation method (see FIG. 7) by the synchronization control Agent which is an applet name embedded in the screen content, and printing/feeding/MS write/ejection preparation which is a method name, and issues the MS write command and ejection preparation command to the card controller 172, the printing command and ejection preparation command to the receipt controller 174, and the printing command to the journal controller 177.

By this, the card unit 10 writes the magnetic stripe of the card, and prepares for ejection of the card, the receipt printer 20 prints the receipt and prepares for ejection, and the journal printer 70 prints the journal. Each controller 172, 174 and 177 replies completion to the printing/feeding/MS write/ejection preparation method by the completion of command execution.

And the printing/feeding/MS write/ejection preparation method requests to post the transaction status (ejection preparation completion in this case), and the POST Agent 126 sends the request to the Web server 100.

The JSP of the Web server 100 moves to the medium ejection processing and issues the screen content of the medium ejection to the ATM 1. In the ATM 1, the browser 120 displays the medium ejection screen on the customer operation screen of the UOP 6. And the browser 120 calls up the medium ejection method (see FIG. 7) of the synchronization control Agent by the synchronization control Agent, which is an applet name embedded in the screen content, and medium ejection, which is a method name, and issues the releasing command to the card controller 172, releasing command to the receipt controller 174, and bell regeneration command to the sound controller, which is not illustrated.

By this, the card unit 10 releases the card, and the receipt printer 20 releases the receipt, removal of the card and receipt is detected, and if the card and receipt are not removed within a predetermined time, a continuous tone is sounded. Each controller 172 and 174 replies completion to the medium ejection method at the completion of the command execution.

And the medium ejection method requests to post the transaction status (removal completion in this case), and the POST Agent 126 sends the request to the Web server 100.

Then the JSP of the Web server 100 receives the request at the removal completion from the ATM 1 moves to the transaction end processing, and issues the screen content of the transaction end to the ATM 1. In the ATM 1, the browser 120 displays the end screen on the customer operation screen of the UOP 6. The browser 120 calls up the bill/coin method (see FIG. 7) of the synchronization control Agent by the synchronization control Agent, which is an applet name embedded in the screen content, and by the bill/coin storing, which is a method name and issues the storing command to the bill controller 175 and the coin controller 176.

By this, the bill/coin unit 50 stores the counted bills and coins in the internal stacker. Each controller 175 and 176 replies completion to the bill/coin method at the completion of the command execution. And the bill/coin method requests to post the transaction status (storing completion in this case), and the POST Agent 126 sends the request to the Web server 100.

By this, the Web server 100 returns to the above mentioned transaction type select screen, and repeats the same processing.

In this way, the Agent for each processing of the transaction processing is embedded in the screen content of the Web server 100, and one method, which is a processing unit, is called up, so the operation of a plurality of I/O units can be controlled, and different automatic transaction apparatus can be used in common in a general transaction processing flow.

Therefore the screen content for controlling automatic transaction apparatus having different functions and configurations by the Web can be easily created, parallel control is possible, and high-speed I/O unit-control can be implemented. By this, the wait time of a user for the automatic transaction apparatus can be decreased, and the operation rate can be improved.

In this example, the card deposit processing was used for description, but this processing is the same for withdrawal processing, deposit processing/withdrawal processing using a pass book, account printing processing and balance inquiry.

[Method of Decreasing Number of Times of Requests by Agent]

Figure 15:
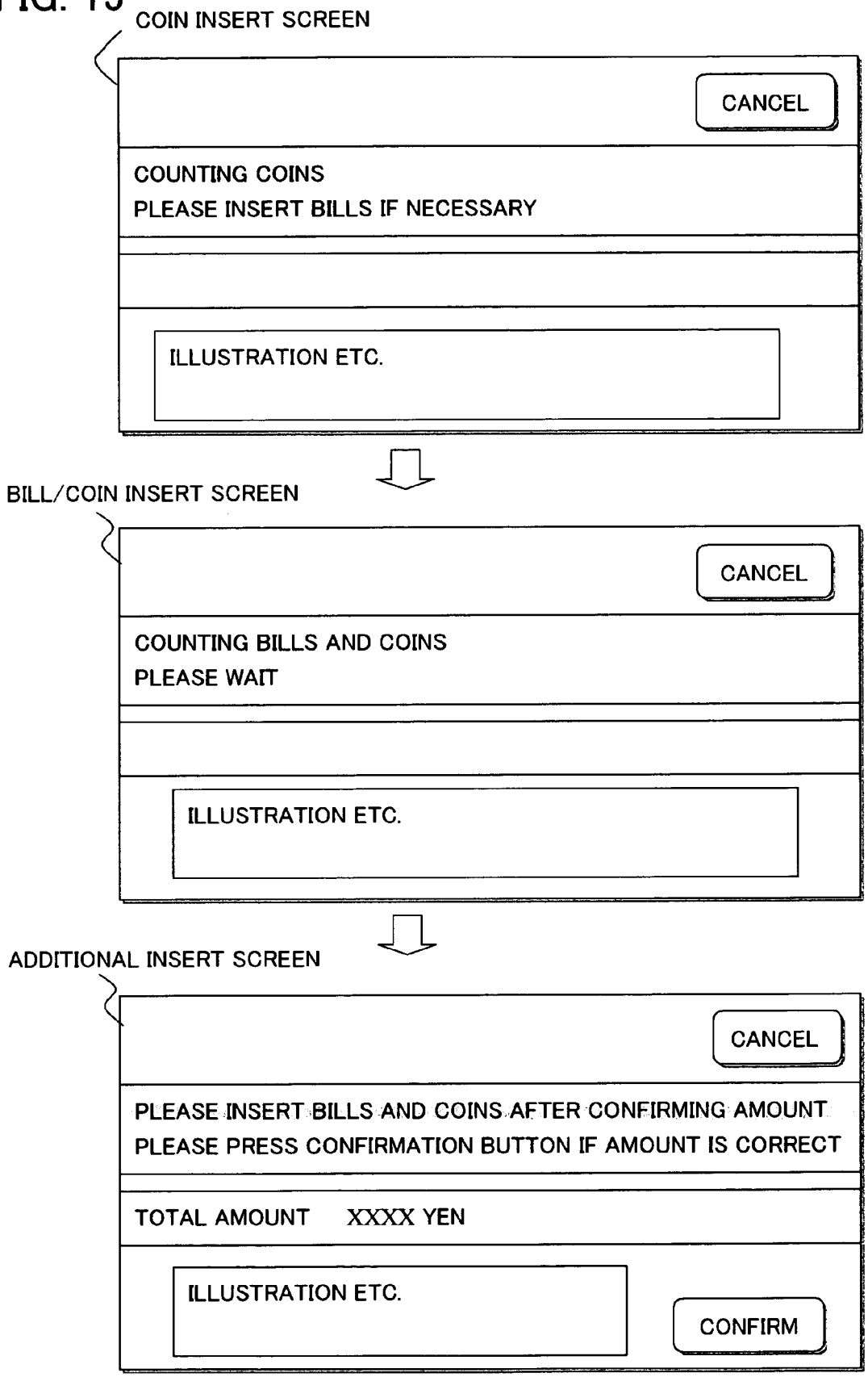
FIG. 15 is a diagram depicting the second guide screen update operation according to an embodiment of the present invention.

Now a method of decreasing the number of times of requests by the Agent will be described. FIG. 14 to FIG. 16 are diagrams depicting the transition of the cash insertion screen described in FIG. 13, and FIG. 17 is a flow chart depicting the processing of the View Agent 128 in FIG. 4.

Figures 16, 17:
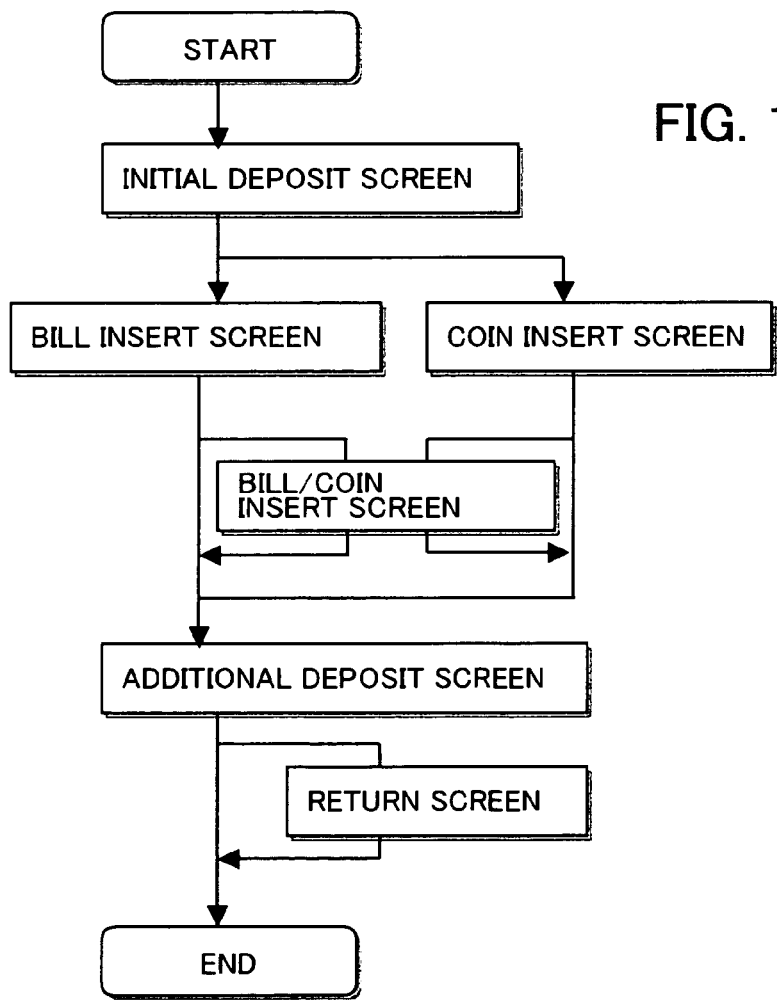
FIG. 16 is a diagram depicting the third guide screen update operation according to an embodiment of the present invention.
FIG. 17 is a flow chart depicting the screen update processing of the View Agent according to an embodiment of the present invention.

In the guide screens in FIG. 14 to FIG. 16, the shaded portions indicate the screen updatable areas (that is the Applet areas) by the View Agent 128 in FIG. 17.

As FIG. 14 to FIG. 16 show, in the bill/coin insertion processing, the guide screen of the UOP 6 shifts from the initial deposit screen in FIG. 14, to the bill insertion screen, then to the coin insertion screen in FIG. 15, bill/coin insertion screen, additional insertion screen, and to the validation failure return screen in FIG. 16, according to the operation of the bill insertion, coin insertion, counting/validation, additional insertion and validation failure return operation of the bill/coin unit 50.

In other words, as FIG. 14 shows, the initial deposit screen is a bill/coin insertion instruction screen, with the message "Insert bills and coins. Max xxx bills and xxx coins can be inserted." If bills are inserted into the bill/coin unit 50, the screen shifts to the bill insertion screen shown in FIG. 14, and indicates the bill counting status with the message "Counting the bills. Insert coins if necessary."

If coins are inserted first, on the other hand, into the bill/coin unit 50, the screen shifts to the coin insertion screen shown in FIG. 15, and indicates the coin counting status with the message "Counting the coins. Insert the bills if necessary." If both bills and coins are inserted into the bill/coin unit 50, the screen shifts to the bill/coin insertion screen shown in FIG. 15, and indicates the bill/coin counting status with the message "Counting the bills and coins. Please wait."

When the bill/coin unit 50 ends the validation of the inserted bills/coins, the screen shifts to the additional insertion screen shown in FIG. 15, and indicates the validation result confirmation and the additional inquiry status with the messages "Confirm the amount and deposit the bills and coins. If the amount is correct, press the OK button." And "Total deposit amount xxx Yen."

If the bill/coin unit 50 detects a validation failure as the validation result of the inserted bills/coins, the screen shifts to the validation failure return screen shown in FIG. 16, and returns the un-validated money, and indicates the total amount of the remaining money, with the messages "Cash is returned. Remove the cash and the shutter will close." And "Total deposit amount (of validated cash) xxx Yen."

To shift the screen in this way under Web control, normally a request must be sent to the Web server 100 each time the screen is updated, so the number of times of requests increases.

Therefore as FIG. 14 to FIG. 16 show, the screen is constructed such that the updating portions (shaded portions) are the applet areas of the View Agent 128, so that by using the applets of the View Agent 128, screens are shifted from the initial deposit screen to the bill insertion screen, coin insertion screen, bill/coin insertion screen, additional insertion screen, and validation failure return screen as shown in FIG. 17. And according to the screen update instructions from the bill/coin Agent, the necessary applet is called up, and a part of the screen is changed.

As a control method for this, the display method by the inter-applet communication will be described with reference to FIG. 18 and FIG. 19, and the display method by calling up the Java Script will be described with reference to FIG. 20 and FIG. 21. Here only the bill or coin insertion phase is shown as an example.

Figure 18:
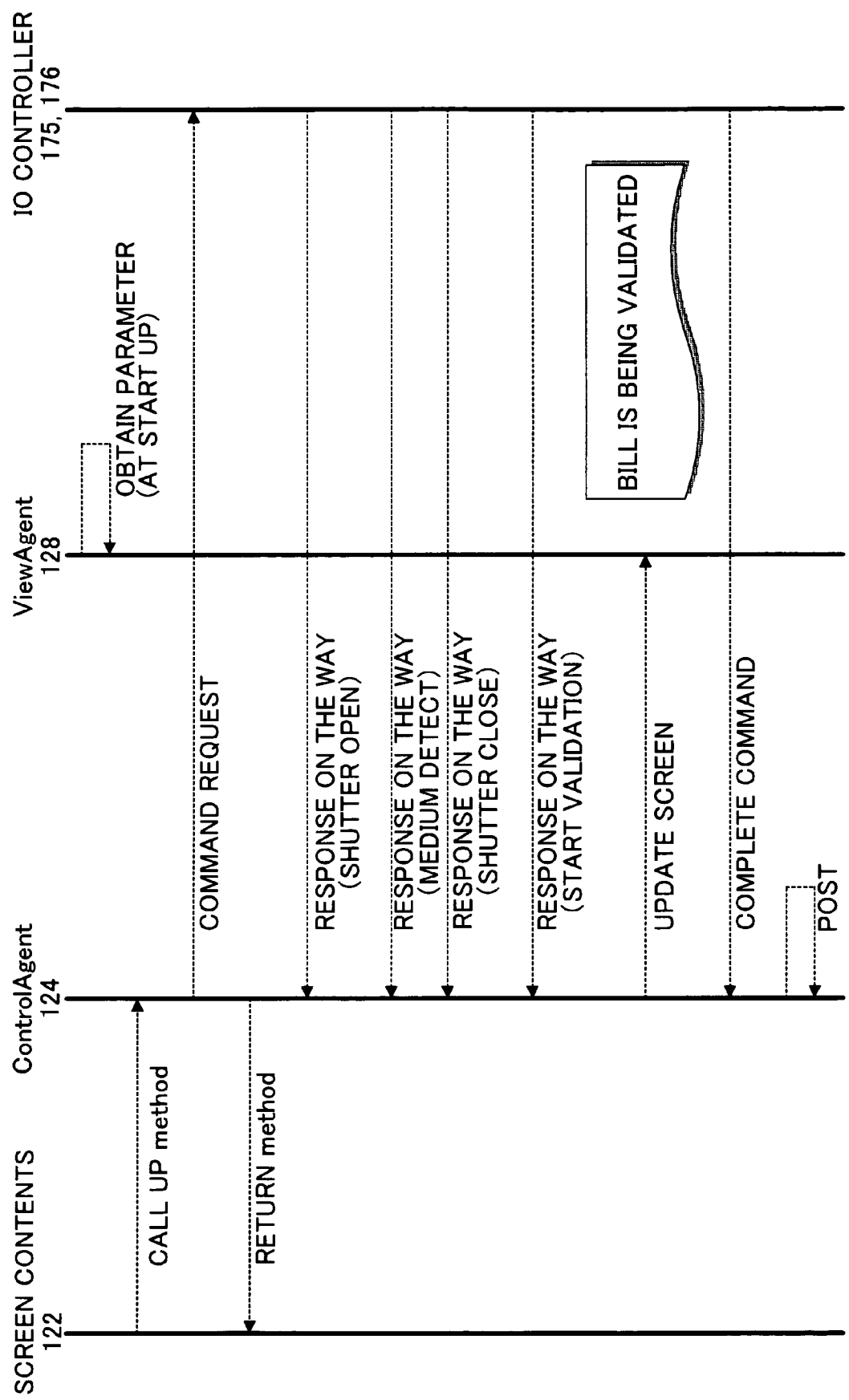
FIG. 18 is a diagram depicting the sequence of I/O control and screen update processing according to an embodiment of the present invention.

FIG. 18 is a diagram depicting the display control operation by inter-applet communication, and FIG. 19 shows the description content of the screen for this display control operation. As FIG. 19 shows, the Agent to be called up in the screen is specified by an applet tag. In this case, <APPLET CODE="U_agtSync_insertCash.~"> is described for inserting bills or coins. Also the View Agent is specified by an applet tag. In other words, <APPLET CODE="U_agtView"~> is described.

And in the SCRIPT <font size> of the View Agent, the message "Insert bills/coins" is written as the parameter of the initial screen. The messages to be displayed on the transition screen of the View Agent are set by the parameter definition of the above mentioned applet tag of the View Agent. In this case the message is <PARAM NAME>, and the message indicates "Validating bills".

This operation by the description language will be described with reference to FIG. 18. At first, when the screen content in FIG. 18 is loaded, the View Agent 128 acquires the parameter definition of the screen content. Then the method (insert Cash) of the control (cash) Agent is called up, and the command is requested to the I/O controllers 175 and 176. The I/O controllers 175 and 176 control the bill/coin unit 50, and respond with the progress status to the control Agent 124 when the shutter is opened, the medium (cash) is detected, the shutter is closed and validation is started.

When the control Agent 124 receives the validation start response, the control Agent 124 requests the View Agent 128 to update the screen. Responding to this, the View Agent 128 creates the screen of the acquired parameter definition and displays it on the UOP 6. In the description in FIG. 19, the message definition is "Validating bills", so as FIG. 14 shows, the screen of UOP 6 shifts from the initial deposit screen to the bill insertion screen.

In the same way, a partial update of the screen is executed by the View Agent 128 when the control Agent 124 request the update. When the I/O controllers 175 and 176 complete command processing, the I/O controllers 175 and 176 notify the command completion to the control Agent 124. The control Agent 124 requests POST to the POST Agent 126, and the POST Agent 126 executes POST processing (transmits request to the Web server 100).

This method is to call up by inter-applet communication at the point of receiving the target event from the control Agent 124, so the scripting amount can be small. On the other hand, each time the screen update timing increases, the parameter set of the applet tag increases, and the control Agent 124 and the JSP must be modified.

Figure 20:
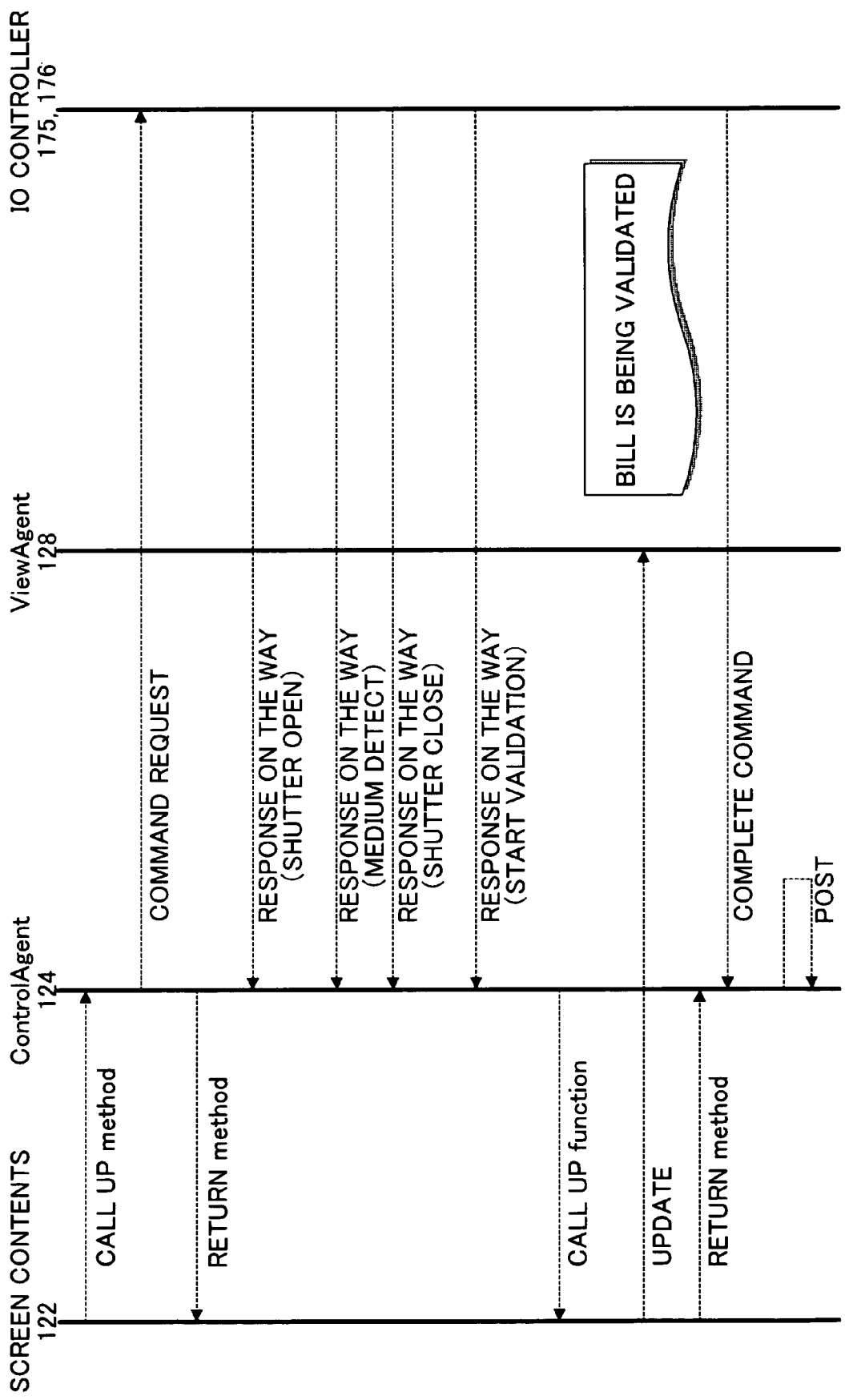
FIG. 20 is a diagram depicting the sequence of I/O control and screen update processing according to another embodiment of the present invention.

FIG. 20 is a diagram depicting the display control operation by calling up the Java Script as another control method, and FIG. 21 shows the description content of the screen thereof. As FIG. 21 shows, the Agent to be called up in the screen is specified by the applet tag. In this case, <APPLET CODE="U_agtSync_insertCash.~"> is described for the cash insertion of bills or coins. Also the View Agent is specified by the applet tag. In other words, <APPLET CODE="U_agtView"~> is described.

Then the function to be called up from the control Agent 124 is defined by the SCRIPT. In other words, "function insertCashFunc (eventKind, billVal, coinVal)" {switch (eventKind){" is described for switching the content for each event. The switching content is described by case 1: calling up validation start (bills)// View Agent, by case 2: calling up validation start (coins)//View Agent, and—case n: end of validation (bills/coins)// View Agent.

Then as the parameters of the initial screen, the message "Insert bills/coins" is described by <font size> of the SCRIPT. The operation by this description language will be described with reference to FIG. 20. At first, the screen content 122 calls up the method (insert Cash) of the control (cash) Agent, and requests a command to the I/O controllers 175 and 176. The I/O controllers 175 and 176 control the bill/coin unit 50, and respond the progress status to the control Agent 124 when the shutter is opened, the medium (cash) is detected, and the shutter is closed and validation is started.

When the control Agent 124 receives the validation start response, the control Agent 124 calls up the function (JSObject) of the Java Script of the screen content.122. The View Agent 128 is called up as a method by the function of the Java Script. The message is selected by judging the argument (e.g. validation status, number of bills to be validated) of the called up function. By this selection, the View Agent 128 creates the screen of the message of the called up function, and displays it on the UOP 6. In the description in FIG. 21, the message definition is "validating bills", so as shown in FIG. 20, the screen of the UOP 6 shifts from the initial deposit screen to the bill insertion screen.

In the same way, the screen is partially updated by the View Agent 128 when the update request is sent from the control Agent 124. When the I/O controllers 175 and 176 complete the command processing, the I/O controllers 175 and 176 notify the completion of the command to the control Agent 124. The control Agent 124 requests POST to the POST Agent 126, and the POST Agent 126 executes POST processing (transmits request to the Web server 100).

In this method, the control Agent 124 calls up the function (JSObject) of the Java Script of the screen content 122 at target event reception timing, as shown in FIG. 21. And the View Agent 128 is called up as the method within the functions of the Java Script. The message is selected by judging the argument (e.g. validating status, number of bills to be validated) of the called up function.

In this method, the Java Script function is called up at the timing of updating the screen, so button control can be interlocked and the View Agent can be built into a plurality of screens, separating the message display area and the amount display area, for example. The scripting amount increases compared with the example in FIG. 19.

[Automatic Transaction Processing with Less Number of Times of Requests]

Figure 22:
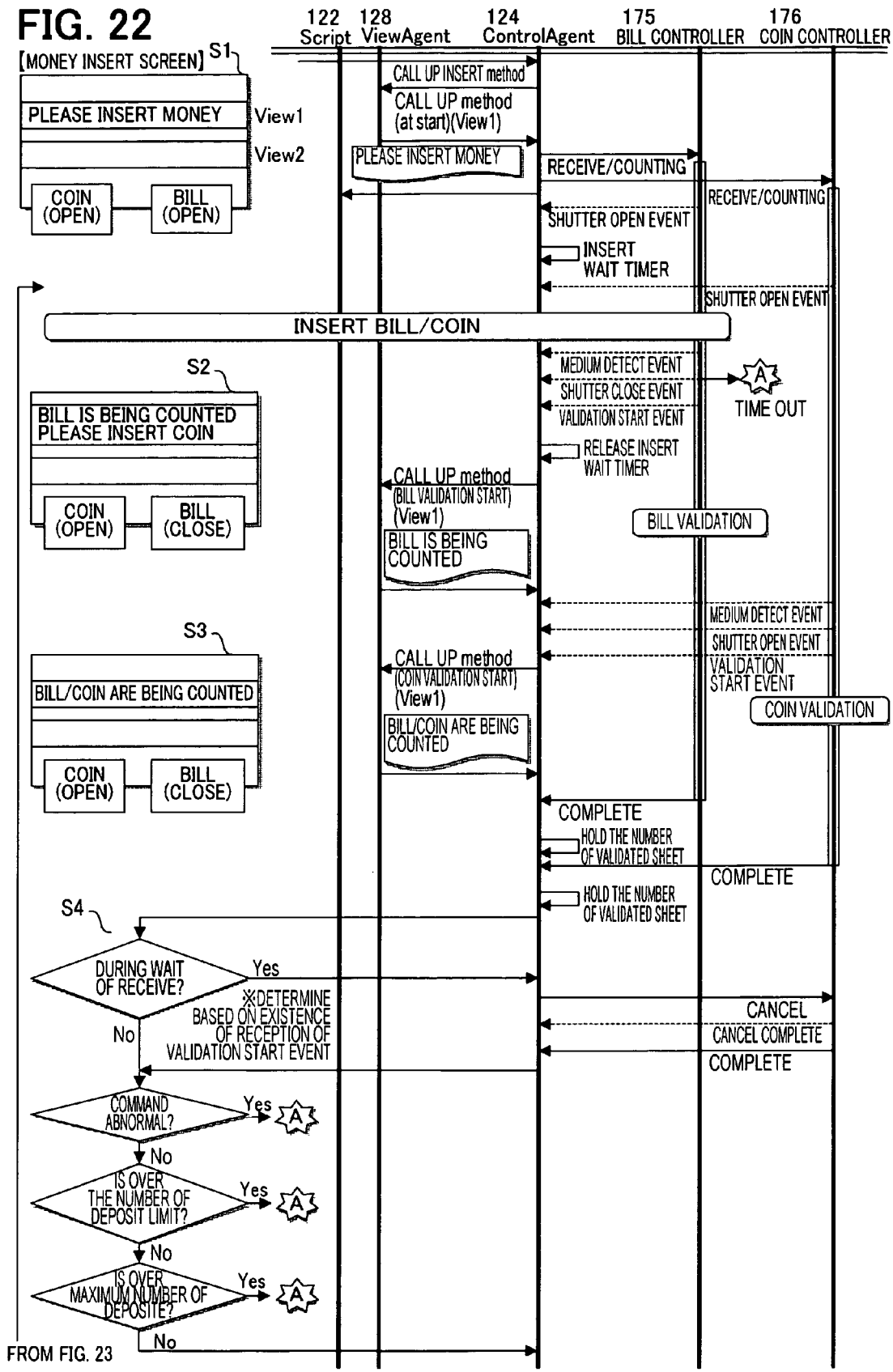
FIG. 22 is a flow chart depicting the bill/coin deposit processing according to an embodiment of the present invention (No. 1)
Figure 23:
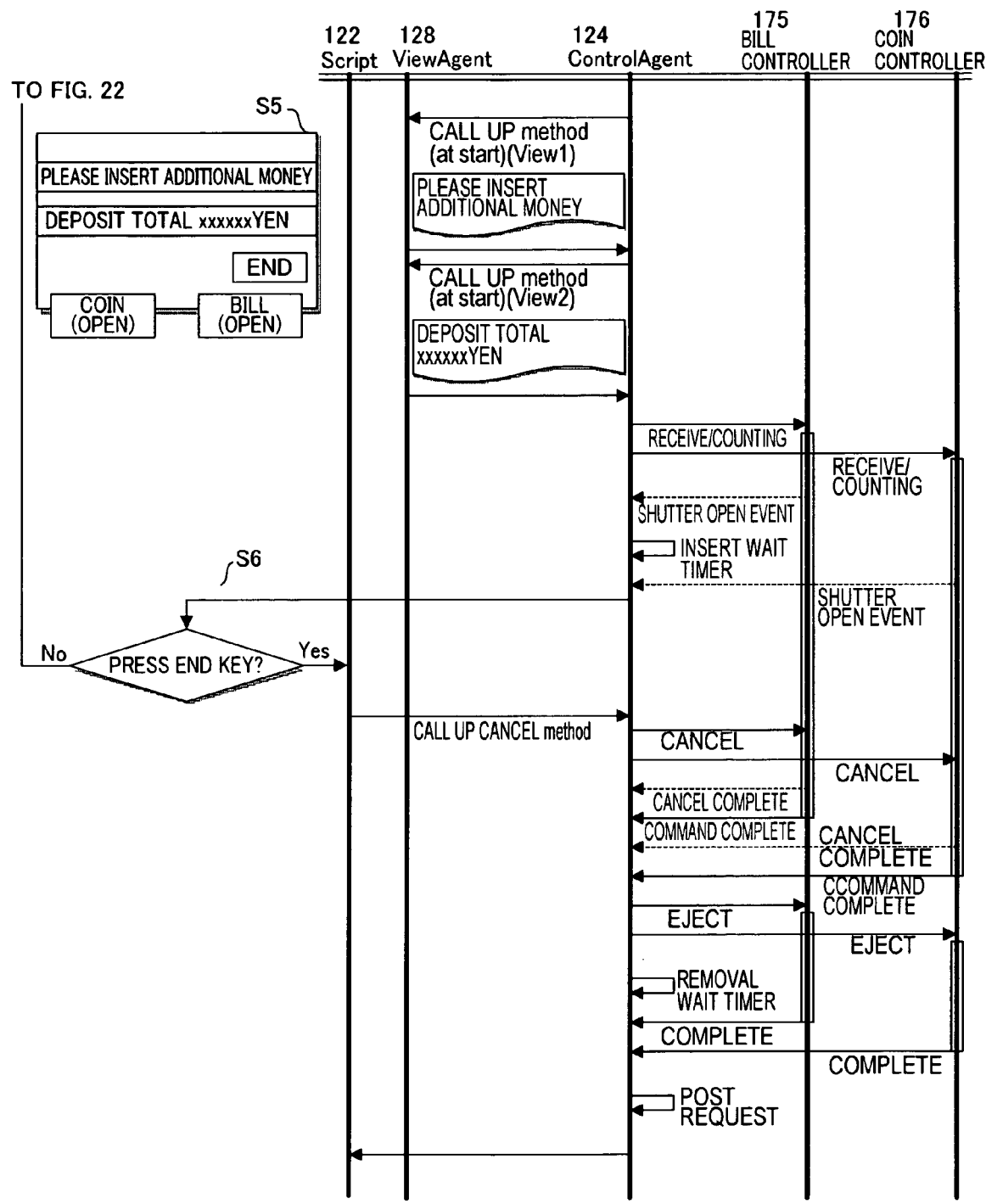
FIG. 23 is a flow chart depicting the bill/coin deposit processing according to an embodiment of the present invention (No. 2)
Figure 24:
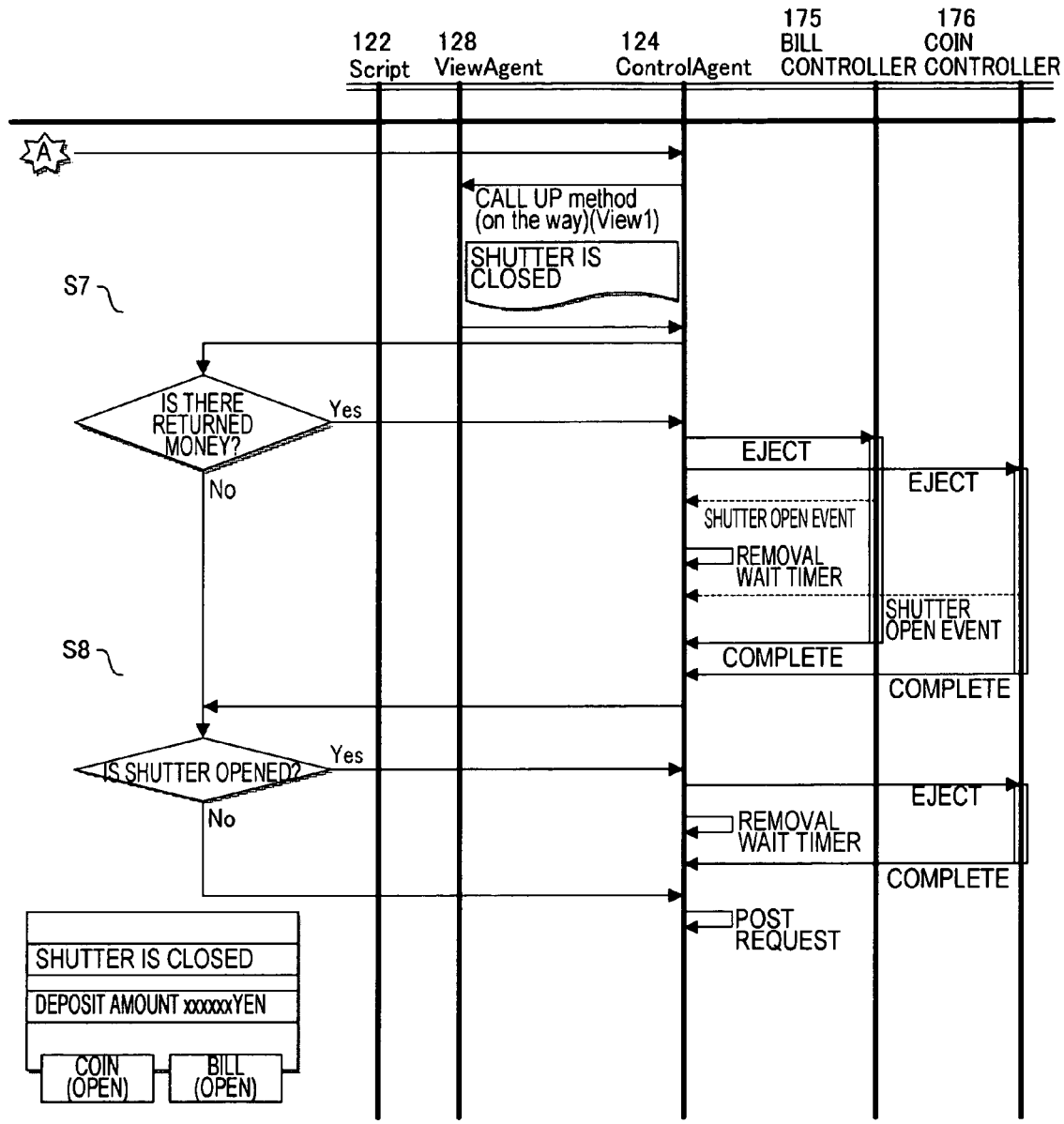
FIG. 24 is a flow chart depicting the bill/coin deposit processing according to an embodiment of the present invention (No. 3)
Figure 27:
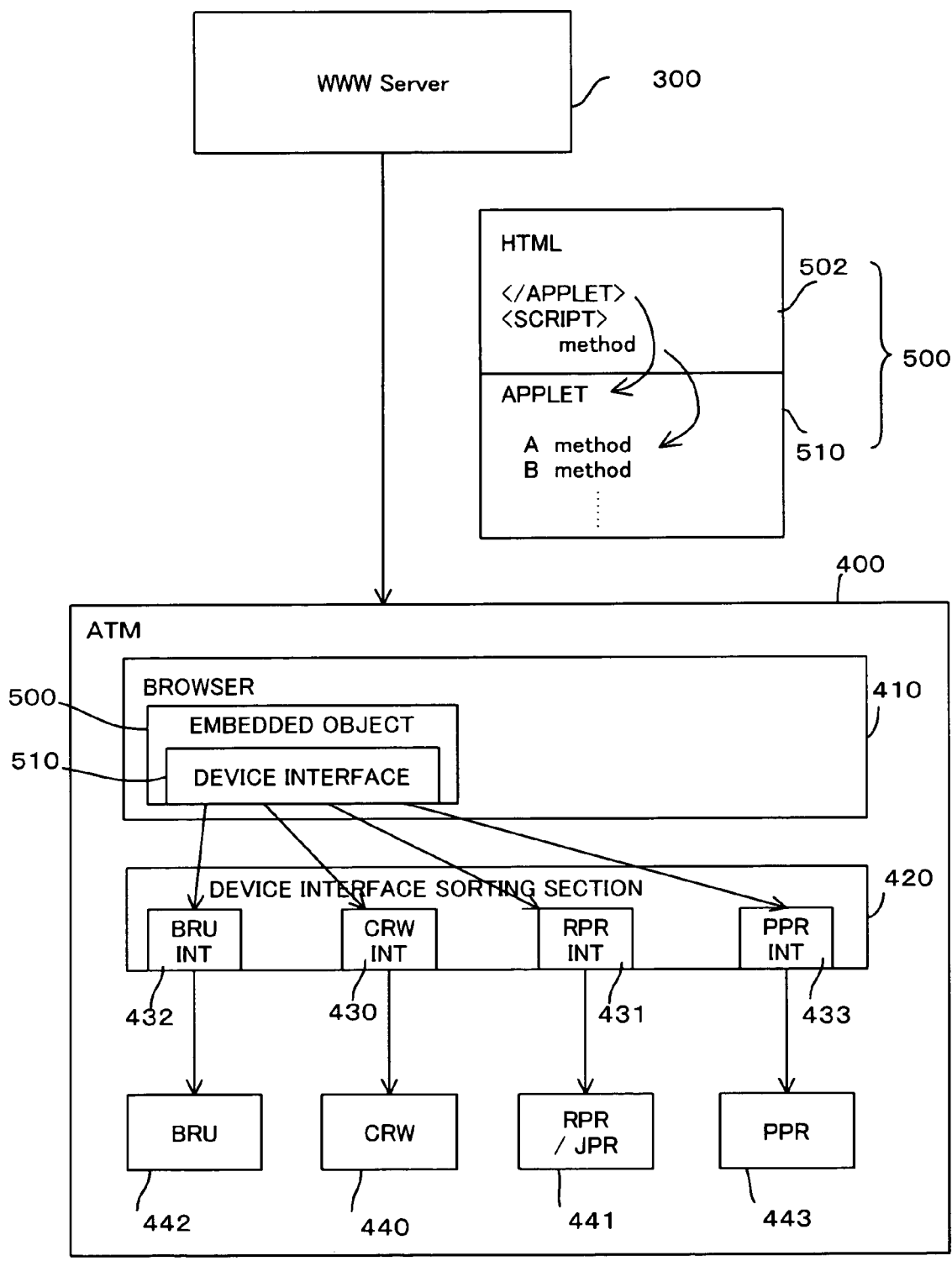
FIG. 27 is a diagram depicting the automatic transaction system by conventional Web control.

Now the automatic transaction processing using the above mentioned method of decreasing the number of times of requests by the Agent will be described with reference to FIG. 22 to FIG. 24. FIG. 22 to FIG. 24 shows the processing sequence of guide screen, Script, View Agent, Control Agent, bill controller 175 and coin controller 176, using the bill/coin validation sequence described in FIG. 14 to FIG. 22 as an example.

(S1) The SCRIPT 122 of the screen content calls up the insertion method (insert Cash) of the control (cash) Agent 124, and the control Agent 124 calls up the method (View 1) of the View Agent 128. The View Agent 128 displays the message "Insert cash" on the UOP 6 for guidance. The control Agent 124 receives the response from the View Agent 128, and issues the acceptance/counting command to the bill controller 175 and the coin controller 176. The bill controller 175 and the coin controller 176 control the bill/coin unit 50, and respond the progress status thereof to the control Agent 124 when the shutter is opened, the medium (cash) is detected, and the shutter is closed and validation is started.

(S2) When the validation start response is received from the bill controller 175, the control Agent 124 calls up the method of the bill validation start from the View Agent 128. Responding to this, the View Agent 128 displays the message "Counting bills, insert coins" on the UOP 6 as guidance. In other words, as shown in FIG. 14, the screen of the UOP 6 shifts from the initial deposit screen to the bill insertion screen.

(S3) When the validation start response is received from the coin controller 176, the control Agent 124 calls up the method of the coin validation start from the View Agent 128. Responding to this, the View Agent 128 displays the message "Counting bills/coins" on the UOP 6 as guidance. In other words, as shown in FIG. 15, the screen of the UOP 6 shifts from the bill insertion screen to the bill/coin insertion screen.

(S4) When the validation completion is notified from the bill and coin controllers 175 and 176, the control Agent 124 holds the validated number of bills/coins. The transaction control Agent for monitoring the transaction status (see FIG. 8) judges whether the transaction is in cash acceptance wait status (e.g. before starting of validation in no coin status). If it is during acceptance wait status, the transaction control Agent requests the coin controller 176 to cancel from the control Agent 124, and the coin controller 176 cancels, and responds with cancellation completion. And control by the coin controller 176 completes.

When it is not during acceptance wait status or when processing of the coin controller 176 completes, the abnormality of the command (abnormality of controller) is judged. If the command is abnormal, processing advances to "A" in FIG. 24. If the command is not abnormal, it is judged whether the number of bills/coins deposited matches or exceeds the limit number of bills/coins. If the number matches or exceeds, processing also advances to "A" in FIG. 24. Also it is judged whether the number of times of deposit exceeds the maximum number of times. If the number exceeds the maximum number of times, processing advances to "A" in FIG. 24.

(S5) If the number is less than the maximum number of times, processing advances to FIG. 23, and the control Agent 124 calls up the method (View 1) of the View Agent 128. The View Agent 128 displays the message "Insert additional cash" on View 1 of the UOP 6 as guidance. The control Agent 124 receives the response from the View Agent 128, and calls up the method (View 2) of the View Agent 128. The View Agent 128 displays the message "Deposit amount xxx Yen" on View 2 of the UOP 6 as guidance. In other words, the screen shifts to the additional insertion screen in FIG. 15. Also the control Agent 124 receives the response from the View Agent 128, and issues the acceptance/counting command to the bill controller 175 and the coin controller 176. The bill controller 175 and the coin controller 176 control the bill/coin unit 50, opens the shutter, and respond this to the control Agent 124.

(S6) Then the transaction control Agent judges whether the end Key (OK Key in FIG. 15) is pressed, and if not, processing returns to step S2 in FIG. 22. If the end Key is pressed, the transaction control Agent calls up the cancellation method of the control Agent 124 from the SCRIPT. And the transaction control Agent request cancellation to the bill and coin controllers 175 and 176 from the control Agent 124, the bill and coin controllers 175 and 176 perform cancellation, and respond with the completion of the cancellation command. Also the transaction control Agent requests ejection for closing the shutter to the bill/coin controllers 175 and 176 from the control Agent 124. And the bill/coin controllers 175 and 176 close the shutter and respond with the completion of the command. The control Agent 124 requests POST to the POST Agent 126, and the POST Agent 126 executes POST processing (transmits request to the Web server 100).

(S7) When processing advances to "A" in FIG. 24, the control Agent 124 calls up the method (View 1) of the View Agent 128. The View Agent 128 displays the message "closing shutter" on View 1 of the UOP 6 as guidance. After the control Agent 124 receives the response from the View Agent 128, the transaction control Agent judges whether return cash exists. If return cash does exist, this is notified to the control Agent 124, and the control Agent 124 requests the bill/coin controllers 175 and 176 to eject cash, the bill/coin controllers 175 and 176 open the shutter, and when the removal of the cash is detected, the bill/coin controllers 175 and 176 close the shutter and respond with the completion of the command.

(S8) When return cash does not exist or when the ejection of return cash is completed, the transaction control Agent confirms whether the shutter is open. If the shutter is open, this is notified to the control Agent 124, and the control Agent 124 requests cash ejection to the bill/coin controllers 175 and 176, and the bill/coin controllers 175 and 176 open the shutter, and when the removal of cash is detected, the bill/coin controllers 175 and 176 close the shutter and respond with the completion of the command. If the shutter is not open or if ejection processing has completed, the control Agent 124 requests POST to the POST Agent 126, and the POST Agent 126 executes POST processing (transmits request to the Web server 100).

In this way, as shown in steps S2 to S6, when additional cash is deposited, communication with the Web server 100 is performed (POST processing is executed) all at once when a plurality of number of times of additional deposits are all completed, not communicating each time cash is deposited, so unless judgment by the Web server is necessary in the Agent, the Agent can judge the processing, and the number of times of communication can be decreased.

In the same way, a part of the screen is updated by the Agent when the screen is updated, without downloading all the data from the Web server, so the screen can be updated without communicating with the Web server. In this case, the message on the deposit screen can be updated, and the message at additional deposit can be updated.

Therefore the number of times of requests to the Web server 100 decreases, the number of times of communication and the communication time can be decreased, the transaction performance (speed) of the automatic transaction apparatus can be increased, and load of the Web server can be decreased.

Also processing is interrupted if communication with the Web server is not performed for a predetermined time based on the timer in POST processing, described in FIG. 9. Therefore an inquiry on communication to the Web server is unnecessary, the number of times of communication can be decreased, and the client (ATM) side can interrupt processing even when communication with the Web server is disconnected.

[Other Embodiments]

Now other embodiments of the above mentioned Agent and method will be described. FIG. 25 is a table showing agents according to another embodiment of the present invention. As FIG. 25 shows, according to this example, the synchronization Agent and the method (program) are separated, and the synchronization Agent has initialization, mechanism reset, bill/coin insertion, medium simultaneous ejection, printing/feeding/MS write/ejection preparation, deposit return, storing, forced ejection/capturing, unit information acquisition/transaction status setting/two-screen display control, deposit/withdrawal preparation, forced replenishment, jam reset and card/pass book insertion as methods.

Each method issues a command to the I/O controller (that is the I/O unit) indicated by the black dot in FIG. 25, and receives the reply of the command execution result. For example, the initialization method of synchronization control Agent issues the initialization command to the bill controller 175, coin controller 176, passbook controller 171, card controller 172, receipt controller 174, journal controller 177, transaction controller 178 and ten key controller 173 (see FIG. 5), has each controller execute initialization processing, and receives the initialization processing result from each controller as the reply.

In the same way, the mechanism reset method of synchronization control Agent issues the mechanism reset command to the bill controller 175, coin controller 176, pass book controller 171, card controller 172, receipt controller 174, journal controller 177 (see FIG. 5), has each controller execute mechanism reset processing, and receives the mechanism reset processing result from each controller as the reply.

In the same way, the bill/coin insertion method of synchronization control Agent issues the insertion command to the bill controller 175 and coin controller 176 (see FIG. 5), has each controller execute insertion processing, and receives the insertion processing result from each controller as the reply.

FIG. 26 shows the screen content to be transmitted by the Web server 100 according to another embodiment of the present invention.

As FIG. 26 shows, the Agent name to be called up in the screen is specified in the screen content described in HTML (page description language). As an example, the synchronization control (Sync) Agent is called up here by the applet tag <APPLET CODE="U_agtSync_class">.

Also by the description <SCRIPT Language="javaScript>, callup of the initialization method of the synchronization control is specified using Java Script. In other words, callup of the initialization method of the synchronization control is specified by the description ret=document.U_agtSync_initial. Here the details of the screen display content are omitted.

When this screen content is downloaded to the browser 120, the initialization Agent of the synchronization control is specified by the applet tag, and the initialization method of the synchronization control is called up by the call up method name of the SCRIPT.

As described above, the called up initialization method issues the initialization command to the bill controller 175, coin controller 176, pass book controller 171, card controller 172, receipt controller 174, journal controller 177, transaction controller 178 and ten key controller 173 (see FIG. 5), has each controller execute initialization processing, and receives the initialization processing result from each controller as the reply.

In this case as well, as FIG. 12 shows, the called up initialization method continuously issues the initialization command to the bill controller 175, coin controller 176, pass book controller 171, card controller 172, receipt controller 174, journal controller 177, transaction controller 178 and ten key controller 173 (see FIG. 5), and receives the reply from these controllers sequentially as the processing completes.

Therefore the I/O units can be controlled in parallel, and even a plurality of I/O units can be controlled in a short time. Whereas in the case of the method of specifying a method for each I/O unit using conventional Script, which is a sequential control for issuing commands and receiving the reply sequentially for each script, as shown in FIG. 29, it takes time to control an I/O by the Web.

Also the above mentioned Agent is provided for each processing to which a processing unit name is assigned, so ATMs with various functions can be supported with the same applet tags and method names by slightly changing the content of the processing unit. In this example, the content of the processing unit is changed by changing the initial (input Param) in the parenthesis of the method name of the above mentioned method call up SCRIPT. In other words, as FIG. 11 shows, the input Param is comprised of the 8-bit information for setting the input flags for each I/O controller (bill, coin, pass book, card, receipt, journal, transaction control and ten key).

The input flag indicates that the input of the method to the I/O controller where "1" is set is enabled. The called up method refers to this input flag, and determines an I/O controller to which the command is issued. Therefore even ATMs with different functions can execute a same processing with a same applet tag and method name by operating the input flag by the Web server 100.

For example, if the input flag of coins is set to "0" in the case of a transaction apparatus which does not handle coins, issuing a command to the coin controller can be prevented. In the same way, if the pass book input flag is set to "0" in a transaction apparatus which does not handle pass books, issuing a command to the pass book controller can be prevented.

According to this embodiment, compared with the example in FIG. 7, the applet (Agent) to be sent with the screen content can be divided into relatively small capacity programs, so the data volume of transmission content can be decreased, and communication time can be decreased compared with the example in FIG. 25.

In the case of the example of the Agent in FIG. 25, the applet of synchronization control is a relatively large capacity program, because the applet has many methods, but by saving the applet to the cache in the ATM 1, the transmission of this applet becomes unnecessary from the next time it is called up, and the data volume of the transmission content from the next time can be decreased, and communication time can be decreased.

In the above mentioned embodiments, the automatic deposit/withdrawal machine was described as an example of the automatic transaction apparatus shown in FIG. 1, but the present invention can be applied to other apparatus, such as a withdrawal machine, automatic cash loan machine and automatic issuing machine. The network was described using the Internet, but the present invention can also be applied to other networks, and the server can be applied not only for Java SCRIPT, but for other SCRIPTS as well.

The update of the screen was described using deposit processing, but this can be applied to update the re-input guide screen when the correction button is pressed in the PIN number input screen, or to update the re-insertion guide screen of a pass book or card. Also the middleware control customized by a common API was described as an example, but the present invention can be applied to middleware control without using a common API.

The present invention was described by the embodiments, but the present invention can be modified in various ways within the scope of the essential character of the present invention, which shall not be excluded from the scope of the present invention.

Thus the applets and scripts for each processing of the transaction processing are embedded in the screen content of the Web server, and the operation control of the I/O units and an update of the screen are performed, so the number of times of communication with the Web server can be decreased, and the performance of the automatic transaction apparatus can be improved, and therefore the present invention can contribute to popularizing Web control based automatic transaction apparatus.

What is claimed is:

1. An automatic transaction apparatus for communicating with a Web server and performing guide display and a transaction operation according to the operation of a user, comprising:
   a display unit performing said guide display;
   a plurality of I/O units performing said transaction operation; and
   a control unit controlling the guide display of the screen of said display unit according to screen content from said Web server, and controlling said plurality of I/O units according to an object embedded in said screen content,
   wherein said control unit interprets an applet tag of said object, calls up a corresponding method with said applet tag, controls the sequence of said plurality of I/O units by said corresponding method, and updates a display message of said display unit by said corresponding method in cooperation with a view method.

2. The automatic transaction apparatus according to claim 1, wherein said control unit further comprises
   a browser which interprets an applet tag of the screen content from said Web server and performs said guide display, and also interprets an applet tag of said object embedded in said screen content and calls up a method for each processing for controlling said I/O unit, and
   said control unit controls the sequence of said I/O unit from said browser and updates the display message of said display unit according to said sequence control.

3. The automatic transaction apparatus according to claim 2, wherein said control unit performs communication between the applet of said object and the applet of said screen, and updates the display message of said display unit.

4. The automatic transaction apparatus according to claim 2, wherein said control unit calls up a function of said script by the applet of said object, and updates the display message of said display unit.

5. The automatic transaction apparatus according to claim 1, wherein said control unit calls up a method for each processing controlling the synchronization of said plurality of I/O units according to the script of the object embedded in said screen content, and controls the synchronization of said plurality of I/O units.

6. The automatic transaction apparatus according to claim 1, wherein said I/O unit further comprises a cash unit at least receiving cash, validating the received cash, and depositing the cash, and
   said control unit interprets the script of said screen content and updates the display message of said display unit according to the operation of said cash unit.

7. The automatic transaction apparatus according to claim 6, wherein said control unit sends a request to said Web server after executing an initial deposit and additional deposit.

8. A control method of an automatic transaction apparatus for communicating with a Web server and performing guide display and a transaction operation according to the operation of a user, comprising:
   performing guide display on the screen of a display apparatus according to a screen content from said Web server;
   controlling the sequence of I/O units according to an object embedded in said screen content; and
   updating a display message of said display unit according to the sequence control of said I/O units using said objects, wherein
   said controlling comprises
      interpreting an applet tag of said object and calling up a corresponding method with said applet tag; and
      controlling the sequence of said I/O units by said corresponding method,
   and said updating comprises updating a display message of said display unit by said corresponding method cooperating with a view method.

9. The control method of an automatic transaction apparatus according to claim 8,
   wherein said performing guide display comprises interpreting an applet tag of the screen content from said Web server by a browser and performing said guide display,
   said controlling comprises interpreting an applet tag of said object embedded in said screen content and calling up a method for each processing controlling said I/O units, and
   said updating comprises updating the display message of said display unit according to the sequence control of said I/O units from said browser.

10. The control method of an automatic transaction apparatus according to claim 9,
    wherein said updating comprises performing communication between the applet of said object and the applet of said screen, and updating the display message of said display unit.

11. The control method of an automatic transaction apparatus according to claim 9,
    wherein said updating comprises calling up a function of said script by the applet of said object, and updating the display message of said display unit.

12. The control method of an automatic transaction apparatus according to claim 8,
    wherein said controlling further comprises calling up a method for each processing controlling the synchronization of said plurality of I/O units according to the script of the object embedded in said screen content, and controlling the synchronization of said plurality of I/O units.

13. The control method of an automatic transaction apparatus according to claim 8,
    wherein said updating comprises interpreting the script of said screen content and updating the display message of said display unit according to the operation of a cash unit which is provided as said I/O unit for at least receiving cash, validating the received cash and depositing the cash.

14. The control method of an automatic transaction apparatus according to claim 13, further comprising sending a request to said Web server after said cash unit executes an initial deposit and additional deposit.

15. An automatic transaction system comprising:
a Web server; and
an automatic transaction apparatus which communicates with said Web server and performs guide display and a transaction operation according to the operation of a user,
wherein said automatic transaction apparatus comprises:
a display unit performing said guide display;
a plurality of I/O units performing said transaction operation; and
a control unit controlling the guide display of the screen of said display unit according to screen content from said Web server, and controlling said plurality of I/O units according to an object embedded in said screen content,
and wherein said control unit interprets an applet tag of said object, calls up a corresponding method with said applet tag, controls the sequence of said plurality of I/O units by said corresponding method, and updates a display message of said display unit by said corresponding method in cooperation with a view method.

16. The automatic transaction system according to claim 15, wherein said control unit of said automatic transaction apparatus comprises a browser which interprets an applet tag of the screen content from said Web server, and performs said guide display, and also interprets an applet tag of said object embedded in said screen content, and calls up a method for each processing for controlling said I/O units, and
said control unit controls the sequence of said I/O unit from said browser and updates the display message of said display unit according to said sequence control.

17. The automatic transaction system according to claim 16, wherein said control unit performs communication between the applet of said object and the applet of said screen, and updates the display message of said display unit.

18. The automatic transaction system according to claim 16, wherein said control unit calls up a function of said script by the applet of said object, and updates the display message of said display unit.

19. The automatic transaction system according to claim 15, wherein said control unit calls up a method for each processing controlling the synchronization of said plurality of I/O units according to the script of the object embedded in said screen content, and controls the synchronization of said plurality of I/O units.

20. The automatic transaction system according to claim 15, wherein said I/O unit comprises a cash unit at least receiving cash, validating the received cash and depositing the cash, and
said control unit interprets the script of said screen content and updates the display message of said display unit according to the operation of said cash unit.

21. The automatic transaction system according to claim 20, wherein said control unit sends a request to said Web server after executing an initial deposit and additional deposit.

22. An automatic transaction apparatus for communicating with a Web server and performing guide display and a transaction operation according to the operation of a user, comprising:
a control unit controlling a guide display according to screen content from said Web server, controlling a plurality of I/O units according to an object embedded in said screen content, calling up a method corresponding with an interpreted applet tag of said embedded object, controlling a sequence of said plurality of I/O units by said corresponding method, and updating a display message by said corresponding method and a view method.

* * * * *

UNITED STATES PATENT AND TRADEMARK OFFICE
CERTIFICATE OF CORRECTION

PATENT NO. : 7,131,577 B2 Page 1 of 1
APPLICATION NO. : 10/828464
DATED : November 7, 2006
INVENTOR(S) : Tomomichi Obara et al.

It is certified that error appears in the above-identified patent and that said Letters Patent is hereby corrected as shown below:

On the title page item (56) under Ref. cited (Primary Examiner), Line 1, delete "Stcyr" and insert --St.Cyr--, therefor.

Signed and Sealed this

Sixth Day of March, 2007

JON W. DUDAS
*Director of the United States Patent and Trademark Office*